United States Patent
Wuttke

(10) Patent No.: US 8,375,325 B2
(45) Date of Patent: Feb. 12, 2013

(54) CUSTOMIZABLE, MULTI-FUNCTION BUTTON

(75) Inventor: Thomas Wuttke, Mountain View, CA (US)

(73) Assignee: Google Inc., Mountain View, CA (US)

(*) Notice: Subject to any disclaimer, the term of this patent is extended or adjusted under 35 U.S.C. 154(b) by 551 days.

(21) Appl. No.: 11/321,067

(22) Filed: Dec. 30, 2005

(65) Prior Publication Data
US 2007/0157118 A1   Jul. 5, 2007

(51) Int. Cl.
*G06F 3/048* (2006.01)
(52) U.S. Cl. ........ 715/810; 715/764; 715/835; 715/825; 715/840
(58) Field of Classification Search ............... 715/830, 715/835
See application file for complete search history.

(56) References Cited

U.S. PATENT DOCUMENTS

| | | | |
|---|---|---|---|
| 5,736,985 A * | 4/1998 | Lection et al. | 715/840 |
| 6,784,900 B1 * | 8/2004 | Dobronsky et al. | 715/744 |
| 6,917,373 B2 * | 7/2005 | Vong et al. | 715/840 |
| 2002/0057299 A1 * | 5/2002 | Oren et al. | 345/825 |
| 2004/0186775 A1 * | 9/2004 | Margiloff et al. | 705/14 |
| 2005/0039141 A1 * | 2/2005 | Burke et al. | 715/810 |
| 2005/0039144 A1 * | 2/2005 | Wada et al. | 715/840 |
| 2006/0026534 A1 * | 2/2006 | Ruthfield et al. | 715/854 |
| 2006/0090142 A1 * | 4/2006 | Glasgow et al. | 715/780 |
| 2007/0011651 A1 * | 1/2007 | Wagner | 717/110 |
| 2007/0143264 A1 * | 6/2007 | Szeto | 707/3 |
| 2007/0192725 A1 * | 8/2007 | Chen et al. | 715/779 |

FOREIGN PATENT DOCUMENTS

| WO | WO 00/25239 | 5/2000 |
|---|---|---|
| WO | WO 2005/022337 A2 | 3/2005 |
| WO | WO 2005/103929 A1 | 11/2005 |

OTHER PUBLICATIONS

Karger et al.; "What would it mean to blog on the semantic web?"; Web Semantics: Science, Services and Agents on the World Wide Web, Elsevier; vol. 3, No. 2-3; Oct. 2005; pp. 147-157.
Sandy Berger; "Google Toolbar"; www.compukiss.com; Oct. 11, 2004 (print date); 2 pages.
International Search Report for corresponding PCT application with a mailing date of Mar. 19, 2007; 4 pages.
Google Toolbar Help; www.google.com; print date (Dec. 30, 2005); 3 pages.
Forecastfox—Firefox Extension; mozilla.org; Dec. 22, 2004; 1 page.
Firefox Add-ons; Mozilla Update:: Extensions—Archive Search Toolbar Button; https://addons.mozilla.org/extension; Apr. 19, 2005; 4 pages.
Firefox Add-ons; Mozilla Update:: Extensions—Amazon Mini Shop; https://addons.mozill.org/extensions; Jul. 19, 2004; 4 pages.

* cited by examiner

*Primary Examiner* — Doon Chow
*Assistant Examiner* — Anil Kumar
(74) *Attorney, Agent, or Firm* — Harrity & Harrity, LLP

(57) ABSTRACT

A device includes a toolbar. The toolbar includes a button whose function changes based on context and whose visual interface changes based on the function the button is performing.

37 Claims, 25 Drawing Sheets

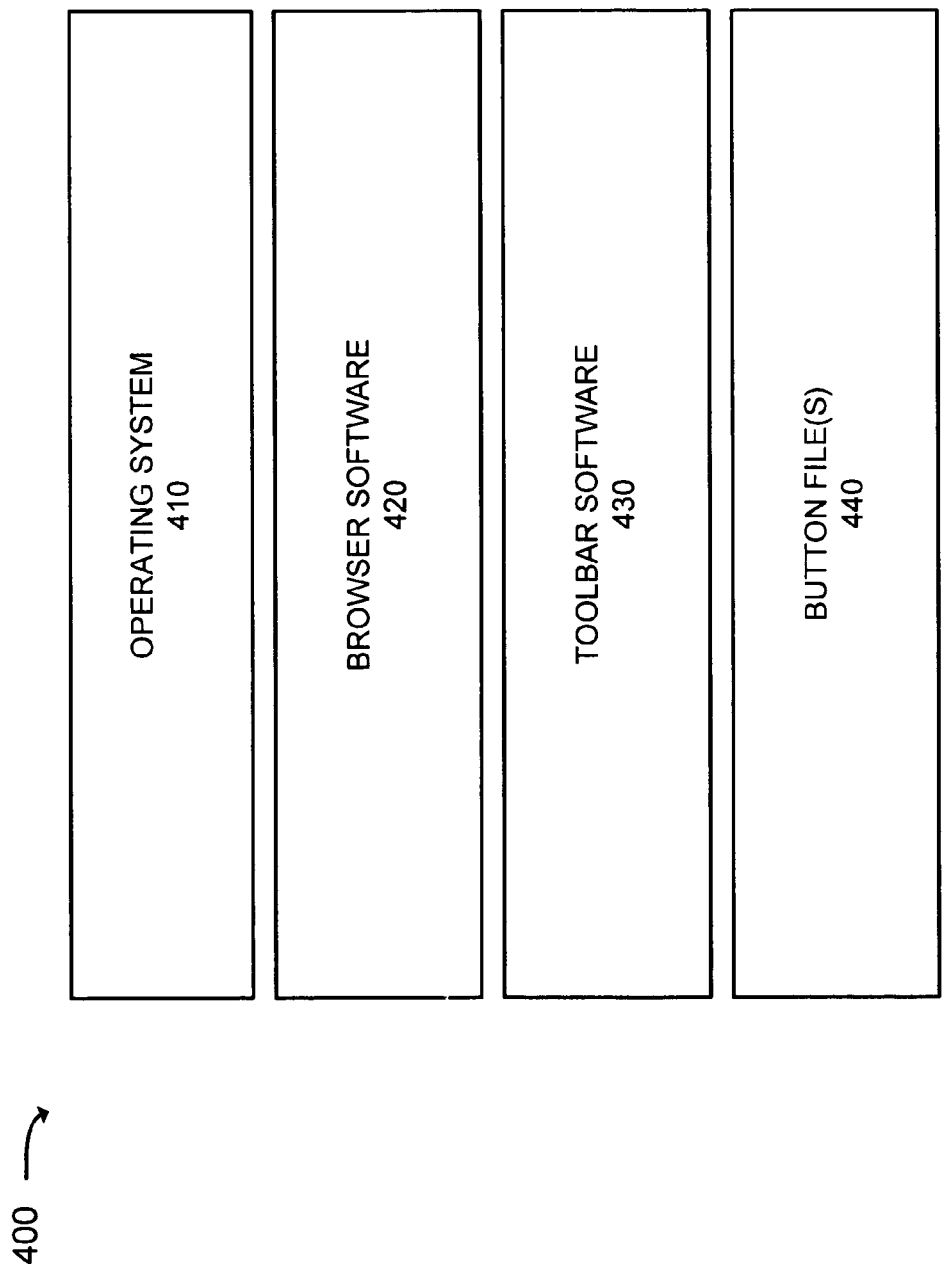

```
<?xml version="1.0"?>
<custombuttons xmlns="http://toolbar.google.com/custombuttons/">
  <button>
    <title attribute>                   ─── 505
    <description attribute>             ─── 510
    <site attribute>                    ─── 515
    <search attribute>                  ─── 520
    <send attribute>                    ─── 525
    <icon attribute>                    ─── 530
    <feed attribute>                    ─── 535
    <feed icon attribute>               ─── 540
    <feed description attribute>        ─── 545
    <update attribute>                  ─── 550
  </button>
</custombuttons>
```

FIG. 5

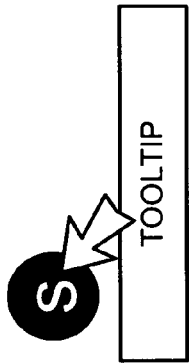
FIG. 6A
FIG. 6B
FIG. 6C
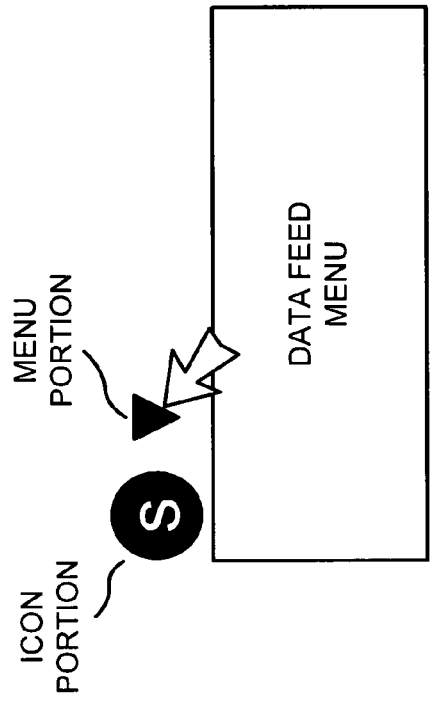
FIG. 6E
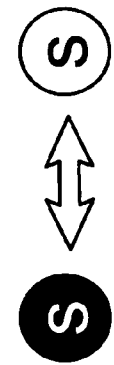
FIG. 6D

810

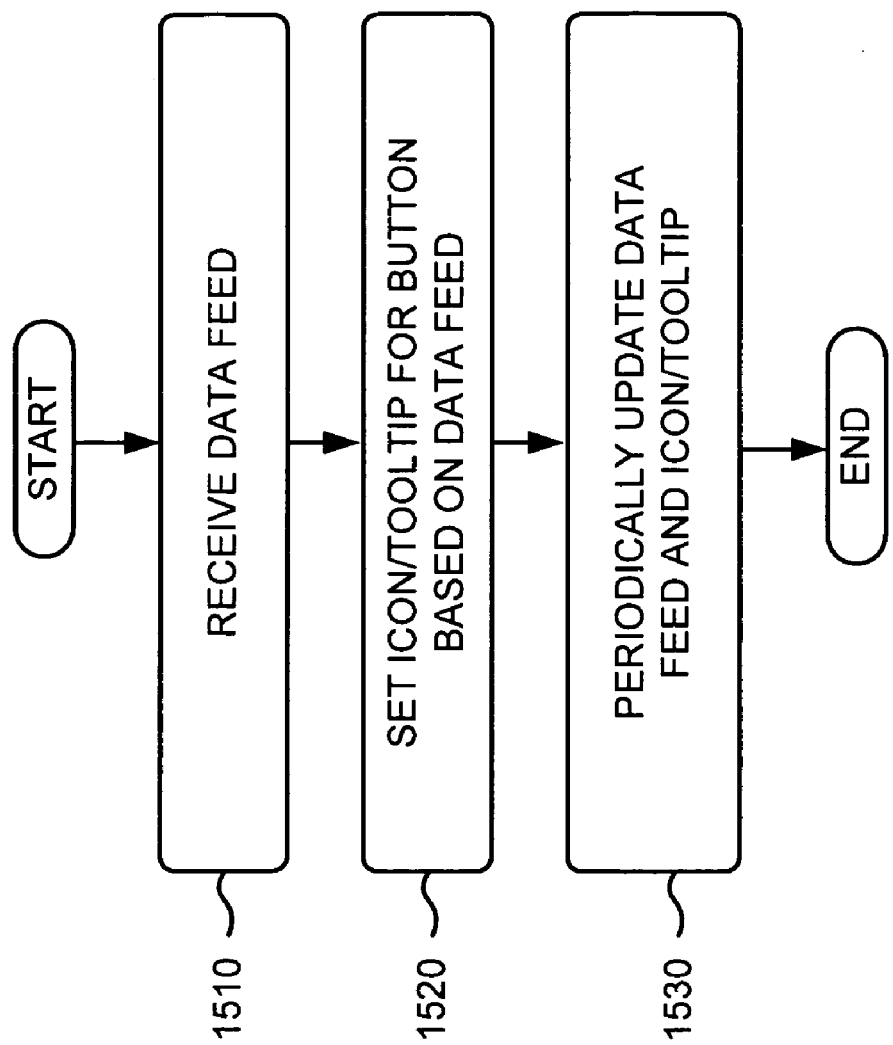

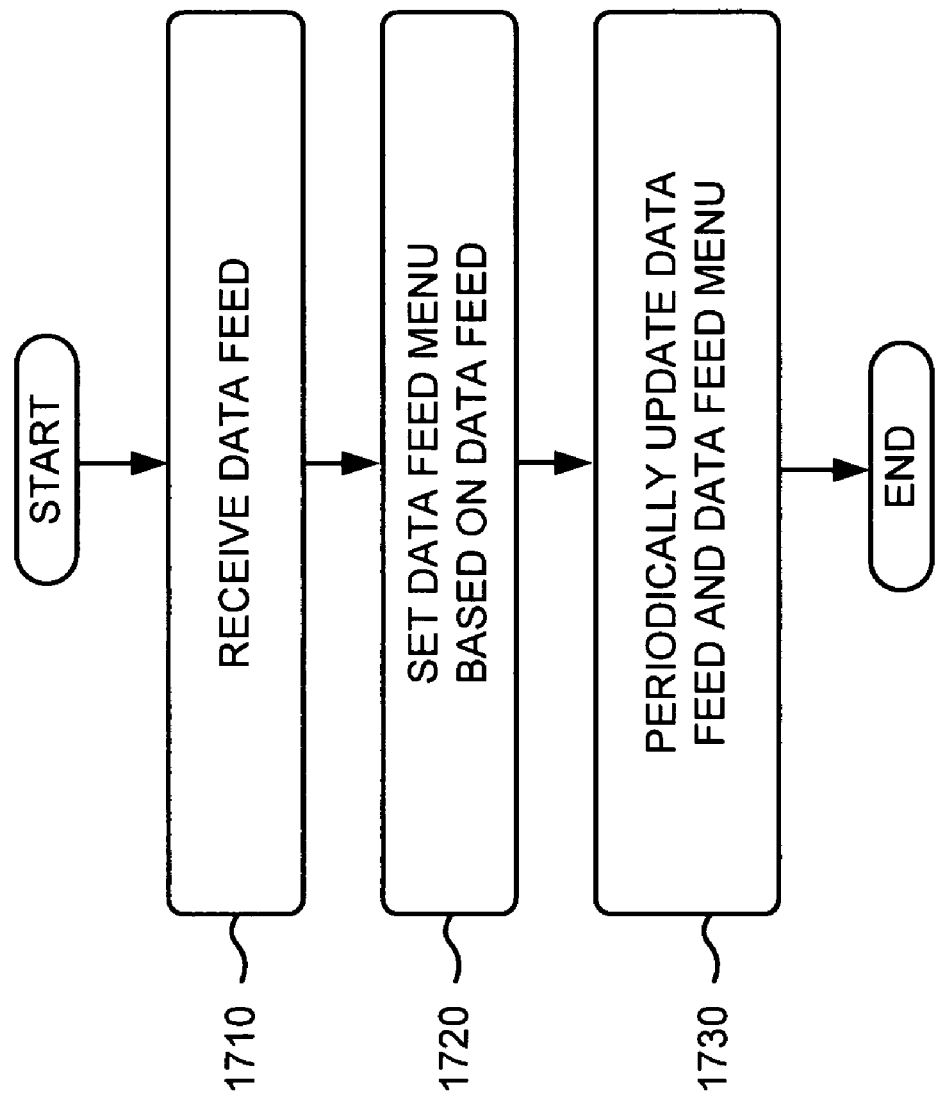

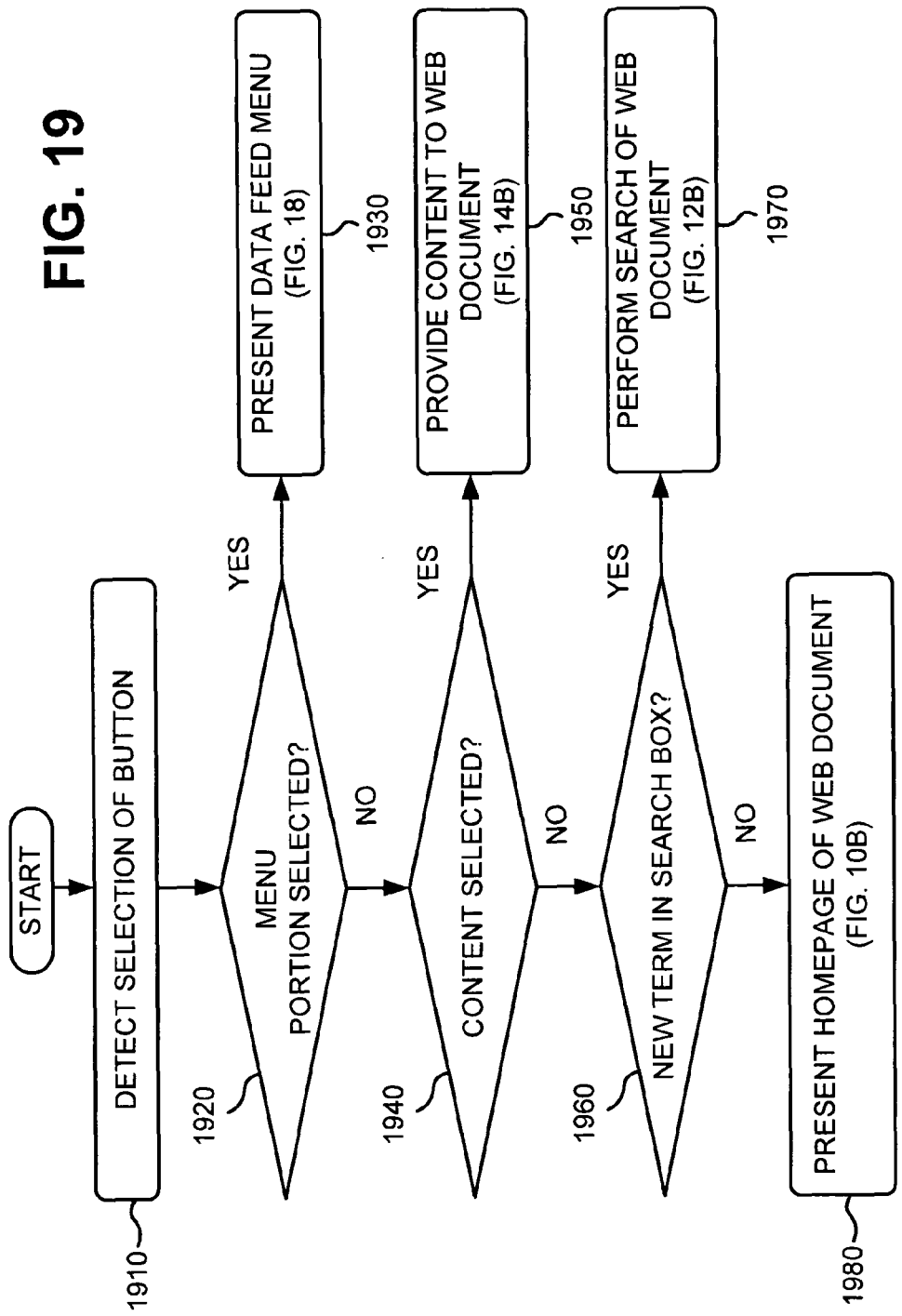

CUSTOMIZABLE, MULTI-FUNCTION BUTTON

BACKGROUND

1. Field of the Invention

Implementations described herein relate generally to information retrieval and, more particularly, to a customizable button that permits one or more information retrieval functions to be performed.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are identified as search results and are returned to the user as links.

Many companies currently offer add-on toolbars to improve the users' search experience. Oftentimes, these add-on toolbars provide functionality that is not available in existing web browsers. For example, an add-on toolbar may permit a user to perform a search right from the toolbar, permit terms to be highlighted on a web page, provide pop-up protection, and do other things to assist the user in finding information of interest.

Sometimes, the user is permitted to customize the ad-on toolbar by specifying what buttons or information the toolbar presents. This is accomplished by presenting the user with a list of items from which the user must choose the various pre-established buttons or information that will subsequently be presented on the toolbar.

SUMMARY

According to one aspect, a device may include a toolbar. The toolbar may include a button whose function changes based on context and whose visual interface changes based on the function the button is performing.

According to another aspect, a device may include means for providing a user interface object within a browser graphical user interface; means for providing a button within the user interface object, the button being capable of performing a number of functions; means for changing the function being performed by the button based on context; means for providing a visual interface associated with the button; and means for changing the visual interface based on the function the button is performing.

According to yet another aspect, a computer-readable medium that stores computer-executable code for implementing a custom button may include a single XML file that includes all or substantially all code for defining the custom button.

According to a further aspect, a method may include presenting a document that includes a submit form; detecting a cursor being placed over the submit form; detecting a click of a pointing device when the cursor is placed over the submit form; presenting an option to download a custom button for performing a search of the document in response to the detected click of the pointing device when the cursor is placed over the submit form; and downloading the custom button when the option is selected.

According to another aspect, a system may include means for presenting a document that includes a search box; means for detecting a cursor being placed over the search box; means for detecting a selection by a pointing device when the cursor is placed over the search box; means for downloading a custom button for performing a search of the document in response to the detected selection by the pointing device when the cursor is placed over the submit form; and means for causing the custom button to appear on a toolbar within a browser graphical user interface.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 4 is a diagram of a portion of an exemplary computer-readable medium that may be used by a client of FIG. 2;

FIG. 5 is a diagram of an exemplary XML button file;

FIGS. 6A-6E are exemplary diagrams of a custom button that may provided on a toolbar;

FIG. 15 is a flowchart of a fourth exemplary function that may be performed by a custom button;

FIG. 17 is a flowchart of a fifth exemplary function that may be performed by a custom button;

FIG. 19 is a flowchart of exemplary processing that may be performed by a custom button.

DETAILED DESCRIPTION

The following detailed description of the invention refers to the accompanying drawings. The same reference numbers in different drawings may identify the same or similar elements. Also, the following detailed description does not limit the invention.

Overview

Implementations consistent with the principles of the invention may relate to a custom button that may perform one or more customizable functions, such as custom navigation, search, send, and update functions. For example, when a custom button is selected, the custom button may cause one or more of the following tasks to be performed: (1) navigate the web browser to a web site; (2) navigate the web browser to a web site and perform a search using the web site's search engine based on text the user has entered in a search box; (3) send currently selected text within a web browser window to a web site to populate a form, such as an email, a blog entry, or a text message, and/or cause the web site to perform some action based on the selected text; and/or (4) update an icon, tooltip, and/or menu based on a data feed.

The description to follow will describe the custom button as included as part of an add-on toolbar. It should be understood that the description may equally apply to other forms of buttons and information. For example, the custom button may be implemented as a toolbar button of a web browser toolbar, a menu item within a menu of a web browser, a selectable object (e.g., link or selectable icon) embedded within a document currently being displayed within a web browser window, or a function included within a frame within a web browser window. It should be appreciated by those skilled in the art that in yet other embodiments, other mechanisms—which may or may not be integrated within a browser—for providing the custom button functionality described herein may be used without departing from the spirit of the present invention. The phrase "custom button," as used herein, will be used to refer to any of these implementations for providing custom button functionality.

Figure 1A:
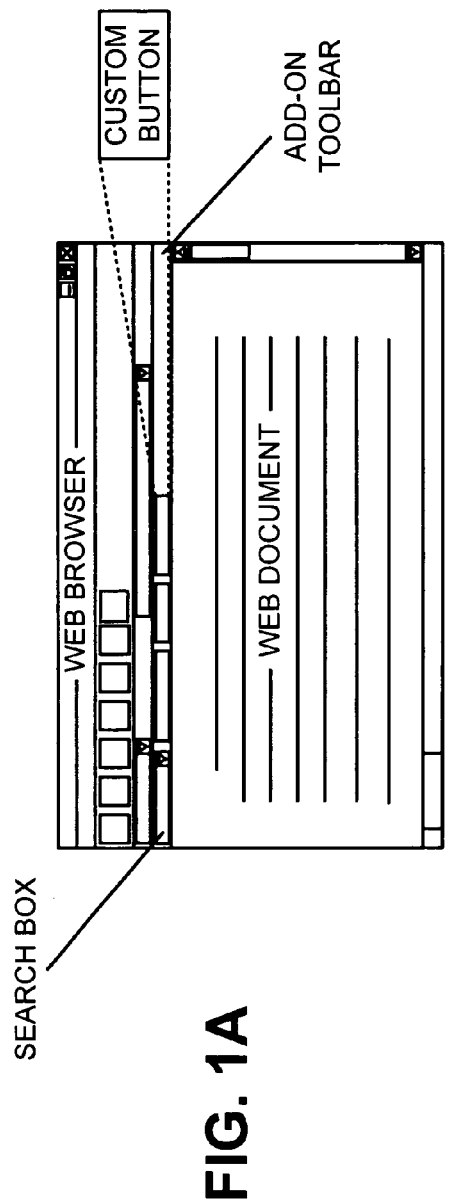
FIGS. 1A-1F is an exemplary diagram illustrating concepts consistent with the principles of the invention.

FIGS. 1A-1F are exemplary diagrams illustrating concepts consistent with the principles of the invention. As shown in FIG. 1A, an add-on toolbar may be associated with a web browser. The add-on toolbar may include a search box and one or more buttons. The search box may permit the user to enter one or more terms and have a search performed based on the entered term(s). Assume that one of the buttons of the add-on toolbar is a custom button. The custom button may be associated with a particular web site that is selectable by the user. For example, the user might create a custom button for any web site, such as a web site associated with Amazon.com®, CNN®, Ebay®, The Weather Channel®, etc. For FIGS. 1A-1F, assume that the custom button is associated with the CNN.com web site.

Figure 1B:
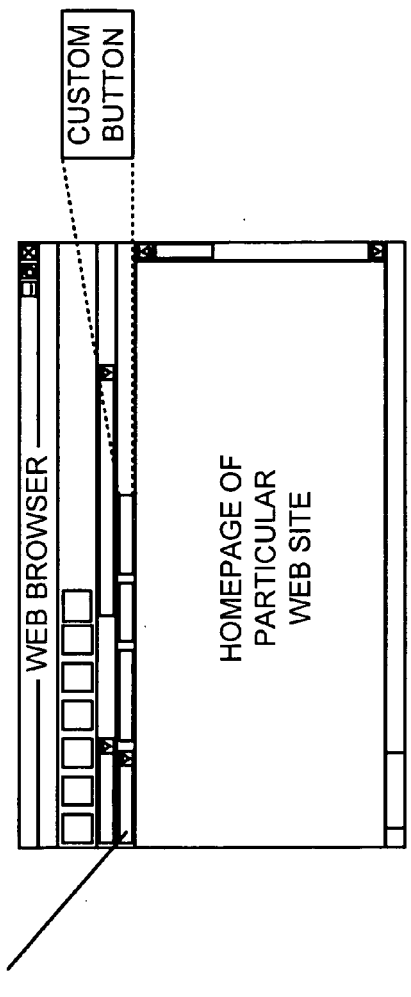

As shown in FIG. 1B, if the user selects the custom button when there is no term in the search box, then the custom button may cause a page (e.g., homepage) of the associated web site to be presented. For example, selection of the custom button may cause the homepage of CNN.com to be presented to the user when there is no term in the search box.

Figure 1C:
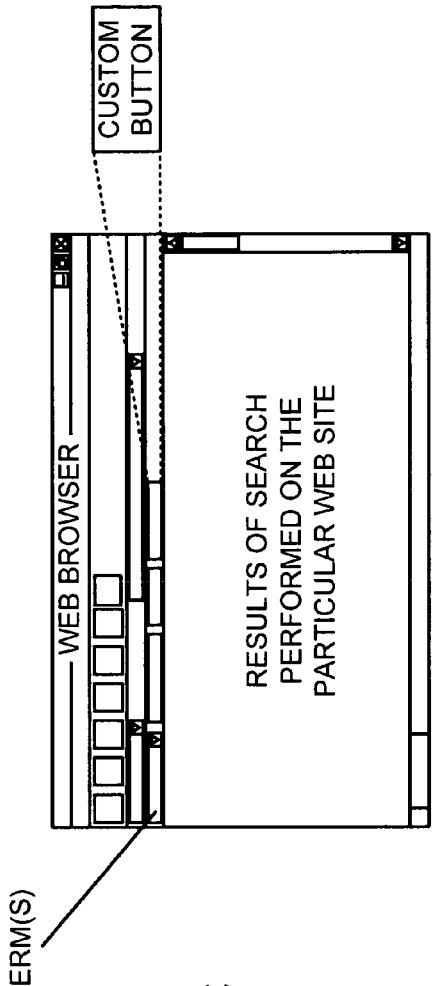

As shown in FIG. 1C, if the user selects the custom button when there is one or more terms in the search box, then the custom button may cause a search to be performed on the associated web site and search results to be presented. For example, assume that the user entered the search term "Iraq" into the search box. In this case, selection of the custom button may cause a search of the CNN.com web site to be performed for news items relating to Iraq, which may then be presented to the user.

Figure 1D:
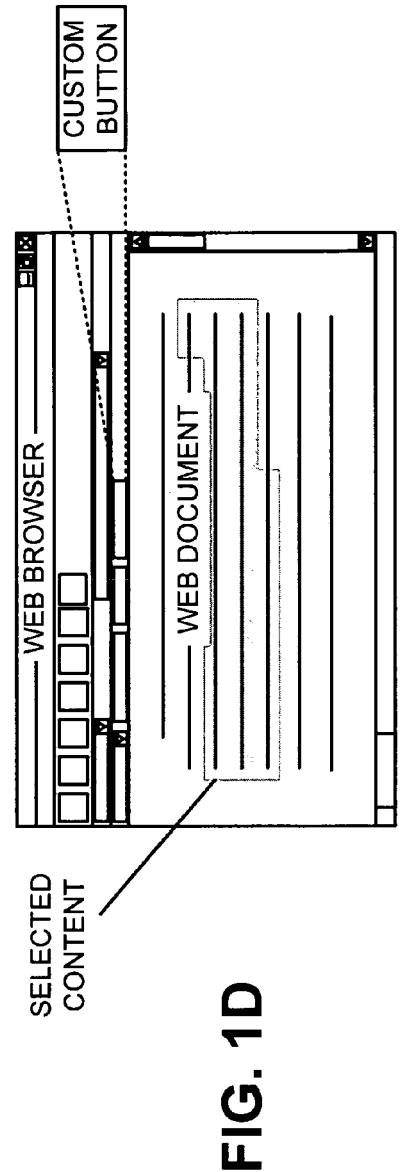
Figure 1E:
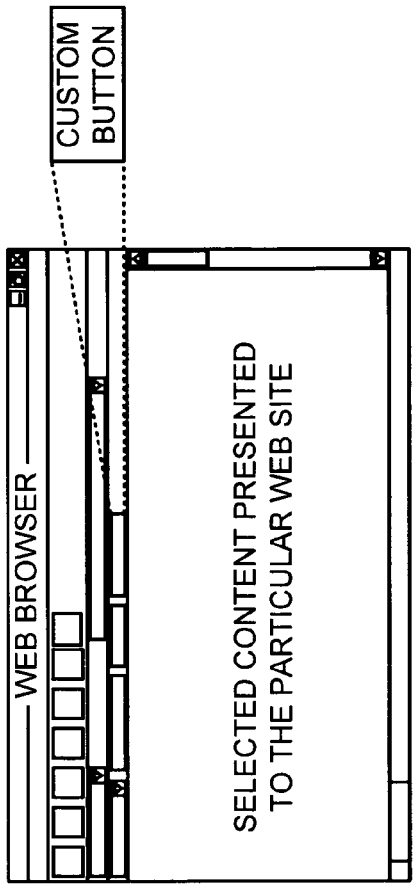

As shown in FIG. 1D, assume that the user selects a portion of content (e.g., highlights text) within a web document and then selects the custom button. Selection of the custom button may cause the selected content to be presented to the associated web site, as shown in FIG. 1E. The selected content may be used to populate a form (e.g., an email, a blog, a text message, or another type of form) within the associated web site or may cause the associated web site to perform some action (e.g., translate the text).

Figure 1F:
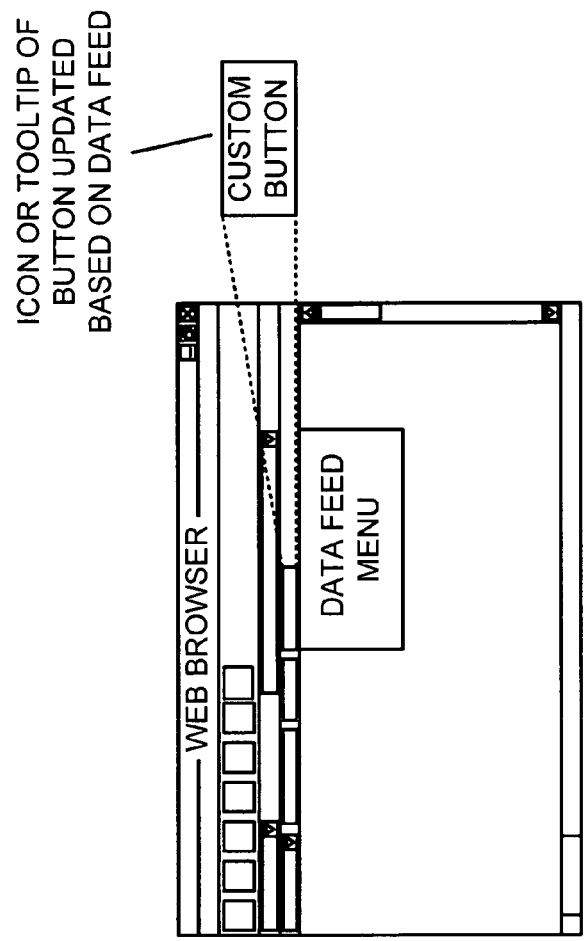

As shown in FIG. 1F, a data feed, such as an RSS, Atom, or XML feed, may be used to set an icon and/or tooltip associated with the custom button and/or populate a data feed menu (e.g., drop down, pop up, etc.). The data feed may periodically update the icon/tooltip and/or data feed menu with new information. The icon/tooltip may reflect that new information is provided via the data feed. For example, the icon/tooltip may be configured to change when new information is presented and revert back once the user has accessed the information. Alternatively, or additionally, the icon/tooltip may reflect information provided by the associated web site. In the case of CNN.com, for example, the icon/tooltip might provide information regarding the urgency of news items provided by the web site. When a news item corresponds to breaking news, the icon/tooltip may provide information indicating that the news item is important or urgent, and when the news item corresponds to regular news (e.g., entertainment news), the icon/tooltip may provide information indicating that the news item is less important or urgent. The data feed menu may provide information from the data feed. In the case of CNN.com, for example, the data feed menu may provide one or more headlines associated with current news items.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
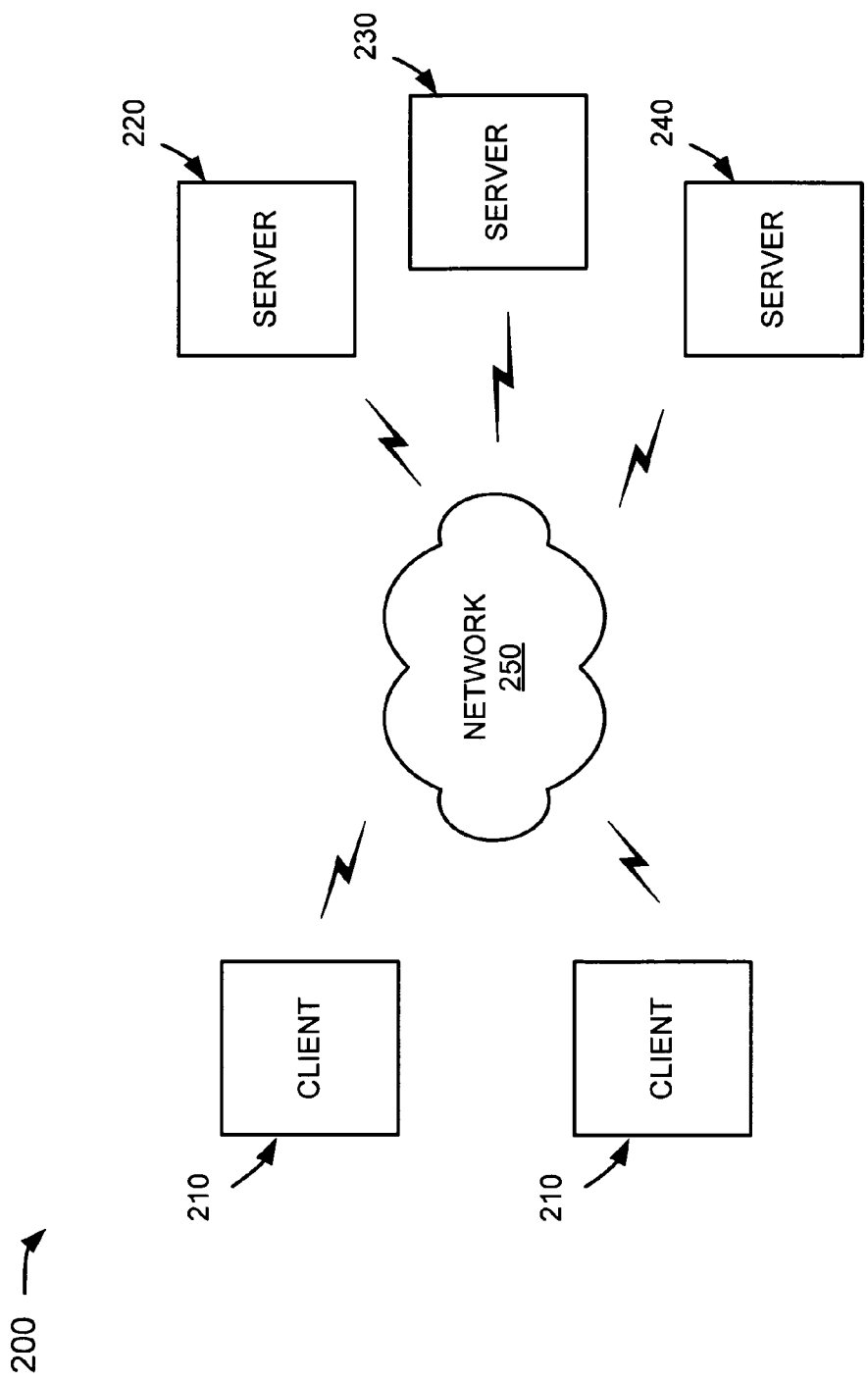
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices.

Servers 220-240 may include server entities that gather, process, search, and/or maintain documents in a manner consistent with the principles of the invention. In an implementation consistent with the principles of the invention, one or more of servers 220-240 may include a search engine usable by clients 210. The search engine may permit clients 210 to search a database associated with server 220-240. For example, server 220 may offer products for sale. In this case, server 220 may maintain a database of the products that it offers and provide a search engine to permit clients 210 to locate products of interest within the database. Alternatively, server 220 may provide information, such as news items. In this case, server 220 may maintain a database of news items and provide a search engine to permit clients 210 to locate news items of interest within the database. Alternatively, server may provide services, such as translation services. In this case, server 220 may receive requests for translation services from clients 210 and provide the translation services to clients 210.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, or a combination of networks. Clients 210 and servers 220-240 may connect to network 250 via wired, wireless, and/or optical connections.

Exemplary Client/Server Architecture

Figure 3:
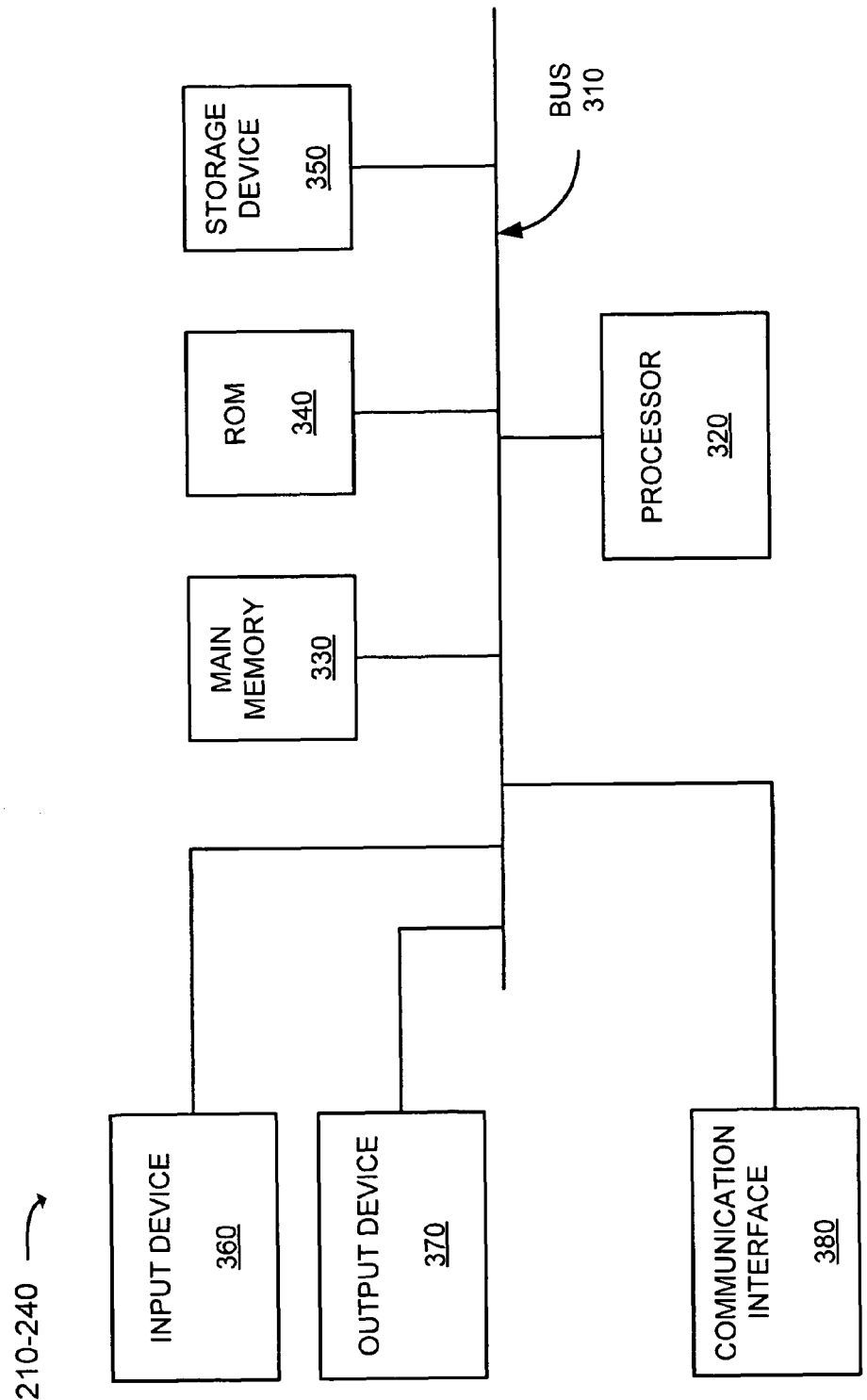
FIG. 3 is an exemplary diagram of a client or server of FIG. 2.

FIG. 3 is an exemplary diagram of a client or server entity (hereinafter called "client/server entity"), which may correspond to one or more of clients 210 and/or servers 220-240. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

The client/server entity, consistent with the principles of the invention, may perform certain operations, as described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Computer-Readable Medium

FIG. 4 is a diagram of a portion of an exemplary computer-readable medium 400 that may be used by a client 210. In one implementation, computer-readable medium 400 may correspond to memory 330 of a client 210. The portion of computer-readable medium 400 illustrated in FIG. 4 may include an operating system 410, browser software 420, toolbar software 430, and button file(s) 440.

Operating system 410 may include operating system software, such as the Windows®, Unix®, or Linux® operating systems. Browser software 420 may include software associated with a web browser, such as the Microsoft Internet Explorer®, Netscape Navigator®, or Mozilla Firefox® browser.

Toolbar software 430 may include a plug-in, an applet, a dynamic link library (DLL), a bookmark, or a similar executable object or process. Client 210 may obtain the executable object or process from a server, such as one of servers 220-240, or from a third party, such as a third party server, disk, tape, network, CD-ROM, etc. Alternatively, the executable object or process may be pre-installed on client 210.

Toolbar software 430 may cause a user interface object, such as an add-on toolbar, to be presented within a web browser window. The user interface object may operate in conjunction with the web browser. In another implementation, the user interface object may be part of the web browser. In this latter implementation, the web browser may perform the functions of the user interface object. In yet another implementation, the user interface object may be a process separate from the web browser. For example, the user interface object may interface between the web browser and network 250.

Toolbar software 430 may be automatically activated upon initiation of the web browser. Alternatively, toolbar software 430 may be activated when instructed by a user. In either case, toolbar software 430 may take the form of a user interface object, as described above.

Button file(s) 440 may include one or more files associated with one or more custom buttons that may be implemented on the toolbar. In one implementation, a custom button may be defined and stored as a single XML file. Each custom button may be stored in its own XML button file. The XML button file may be self-contained, such that everything (or substantially everything) that is needed for the button (from what it looks like to the functions it performs) is included in the XML button file. The XML button file may also be portable, such that the XML button file may be transferred to and/or exchanged between applications, possibly of different types and/or on different devices.

FIG. 5 is a diagram of an exemplary XML button file. As shown in FIG. 5, the XML button file may include one or more of the following attributes: title 505, description 510, site 510, search 520, send 525, icon 530, feed 535, feed icon 540, feed description 545, or update 550. Each of these attributes (except, perhaps, for update 550) may occur more than once within the XML button file as long as each occurrence is assigned to a different locale (which may correspond to the country in which the user is located and/or a language that is associated with the user). If the user's locale (which may be determined using one of a number of well known techniques, such as a technique based on the user's IP address, or may be previously specified by the user) does not match any of the locales identified for a particular attribute, the instance of the attribute occurring first may be used.

Title attribute 505 may include a title for the custom button that may be presented to the user in a list of custom buttons in a custom button editor or optionally next to the custom button on the toolbar. Title attribute 505 may support the same locale variable as search attribute 520, described below. The title given to the custom button may be unique with regard to any other custom button, because the title may function as a default keyword if it appears as a search type (described below). In one implementation, title attribute 505 may take the form of: <title>text</title>.

Description attribute 510 may include a tooltip, which is text that may be presented to the user if the user causes a cursor to hover over the custom button. This text may also be presented to the user after the user downloads the custom button from a web site. Description attribute 510 may support the same locale variable as search attribute 520, described below. In one implementation, description attribute 510 may take the form of: <description>tooltip </description>.

Site attribute 515 may include an address, such as a URL, to navigate to when there is no new term in the search box of the toolbar, where "new term" may refer to one or more terms that have recently been focused (i.e., the term(s) have been recently entered or a cursor has recently been placed over the term(s)). Site attribute 515 may support the same method and locale variables as search attribute 520, described below. Site attribute 515 may also include a variable, such as {domain}, {url}, {url.noescape}, {url.host}, or {locale}. The variable {domain} may include a domain suffix, such as .com or .co.jp. The variable {url} may include the current address in the address bar, possibly including escaped characters (i.e., XML escaped characters, such as &, <, and >). The variable {url.noescape} may include the current address in the address bar as is, with no escaping of special characters. The variable {url.host} may include the current domain in the address bar. The variable {locale} may include the locale of the toolbar (e.g., the location or locale of client 210 containing the toolbar). In one implementation, site attribute 515 may take the form of: <site>url</site>.

Search attribute 520 may include an address, such as a URL, that the web browser may navigate to and search when the custom button is selected (e.g., clicked) and there is a new search term in the search box. Search attribute 520 may include a variable {query} in the search template. The {query} variable may include a search term from the search box or some other information, such as the address of the document currently presented within the web browser window. Search attribute 520 may also include {method}, {charset}, and {locale} variables. The {method} variable may include "get" (to send query data for searching the web site) or "post" (to send selected content from a document to the web site). The {charset} variable may specify a collection of characters to use to encode the query data and/or selected content, such as utf-8, iso-8859-1, latin-1, iso-8859-5, shift_jis, euc-jp, or utf-8. The {locale} variable may specify a locale for which an alternate address may be supplied (e.g., when locale equals "it," it may indicate that an alternate address may be used when the locale corresponds to Italy). In one implementation, search attribute 520 may take the form of: <search>url-template</search>.

Send attribute 525 may include an optional address, such as a URL, that the web browser may navigate to when the user has selected content from a document in the web browser window. Send attribute 525 may include a variable {selection} that may include the selected content. Send attribute 525 may also support the {method}, {charset}, and {locale} variables identified above. In one implementation, send attribute 525 may take the form of: <send>url-template</send>.

Icon attribute 530 may include the actual bits of an icon file, such as a windows-style .ico file or JPG, BMP, GIF, TIFF, PNG, or other types of image files. In one implementation, the bits may be base64 encoded. If no icon attribute 530 is specified, a default icon file may be used. Icon attribute 530 may support the {locale} variable identified above. In one implementation, icon attribute 530 may take the form of: <icon>image-file</icon>.

Feed attribute 535 may specify an address, such as a URL, to a data feed, such as an RSS, Atom, or XML feed. Feed attribute 535 may provide the ability to open a data feed menu (e.g., a pop up or drop down menu) with data feed titles, descriptions, and/or links. Feed attribute 535 may support the {domain} and {locale} variables identified above. Feed attribute 535 may also support {menu}, {refresh-interval}, {refresh-onclick}, and/or {service} variables. The {menu} variable may indicate whether to show or hide the data feed menu. The {refresh-interval} variable may identify the number of seconds to wait before refreshing the data feed. The {refresh-onclick} variable may indicate whether to refresh the data feed each time the user selects the custom button. The {service} variable may indicate whether the user needs to sign into a service to obtain the data feed functionality. In this case, a refresh of the data feed may occur when the user signs into the service and the data feed menu may be cleared when the user signs out of the service. In one implementation, feed attribute 535 may take the form of: <feed>url</feed>.

Feed icon attribute 540 may include an alternate icon to be displayed when the data feed has new information. When a user selects the custom button, the icon may revert back to the normal icon until the next time the data feed is updated. A feed server may specify icon data directly in the data feed response, in which case feed icon attribute 540 and icon attribute 530 may get second priority. In one implementation, the icon data may be base64 encoded. Feed icon attribute 540 may support the {locale} variable identified above. In one implementation, feed icon attribute 540 may take the form of: <feed-icon>image-file</feed-icon>.

Feed description attribute 545 may include an alternate description to display in the tooltip when the data feed has new information. When the user selects the custom button, the description may revert back to the normal description until the next time the data feed is updated. A feed server may specify description data directly in the data feed response, in which case feed description attribute 545 and description attribute 510 may get second priority. Feed description attribute 545 may support the {locale} variable identified above. In one implementation, feed description attribute 545 may take the form of: <feed-description>tooltip</feed-description>.

Update attribute 550 may include an address, such as a URL, from where this button definition was downloaded and where the update function may get a replacement XML file from if the user requests an update. In one implementation, update attribute 550 may take the form of: <update>url</update>.

Each XML button file may also include an arbitrary parameter (not shown in FIG. 5) that is meaningful only to the web document with which the custom button is associated. The web document may decide what the meaning of the parameter is. In the case of a weather document, for example, the parameter may include a zip code. The weather document may use the zip code to focus its weather information. In the case of a stock document, for example, the parameter might include a stock symbol. The stock document may use the stock symbol to identify relevant stock information.

Custom Button Appearance

A custom button may provide different information in different circumstances. FIGS. 6A-6E are exemplary diagrams of a custom button that may be provided on a toolbar. As shown in FIG. 6A, the custom button may include an icon that represents the web site with which the custom button is associated. In the case of CNN.com, for example, the icon may include the familiar CNN logo. As shown in FIG. 6B, the custom button may include a title to accompany the icon on the toolbar. The title may identify the web site with which the custom button is associated. In the case of CNN.com, for example, the title may include CNN.

As shown in FIG. 6C, the custom button may include a tooltip that may be presented when a cursor is located over the custom button. The tooltip may identify the web site with which the custom button is associated or provide other information from the web site. In the case of CNN.com, for example, the tooltip might provide the CNN name or information regarding a news item. As shown in FIG. 6D, the custom button may be configured to change based on information in a data feed. For example, the custom button may change to a different state when new data feed information has been received and revert back to the normal state when the user has accessed the new data feed information (e.g., the user has placed a cursor over, selected, or otherwise accessed the custom button). Alternatively or additionally, the icon of the custom button may change based on information in the data feed. For a weather-related web site, for example, the icon may change based on the current (or forecasted) weather conditions. The icon information may be included in the data feed.

As shown in FIG. 6E, the custom button may include two portions: an icon portion and a menu portion. The icon portion may include an icon that represents the web site with which the custom button is associated. In the case of CNN.com, for example, the icon may include the familiar CNN logo. The menu portion may permit a data feed menu to be presented when, for example, the user has placed a cursor over, selected, or otherwise accessed the menu portion. In the case of CNN.com, for example, the data feed menu may provide a listing of one or more news items from the CNN.com web site.

Creating/Editing A Custom Button

Figure 7:
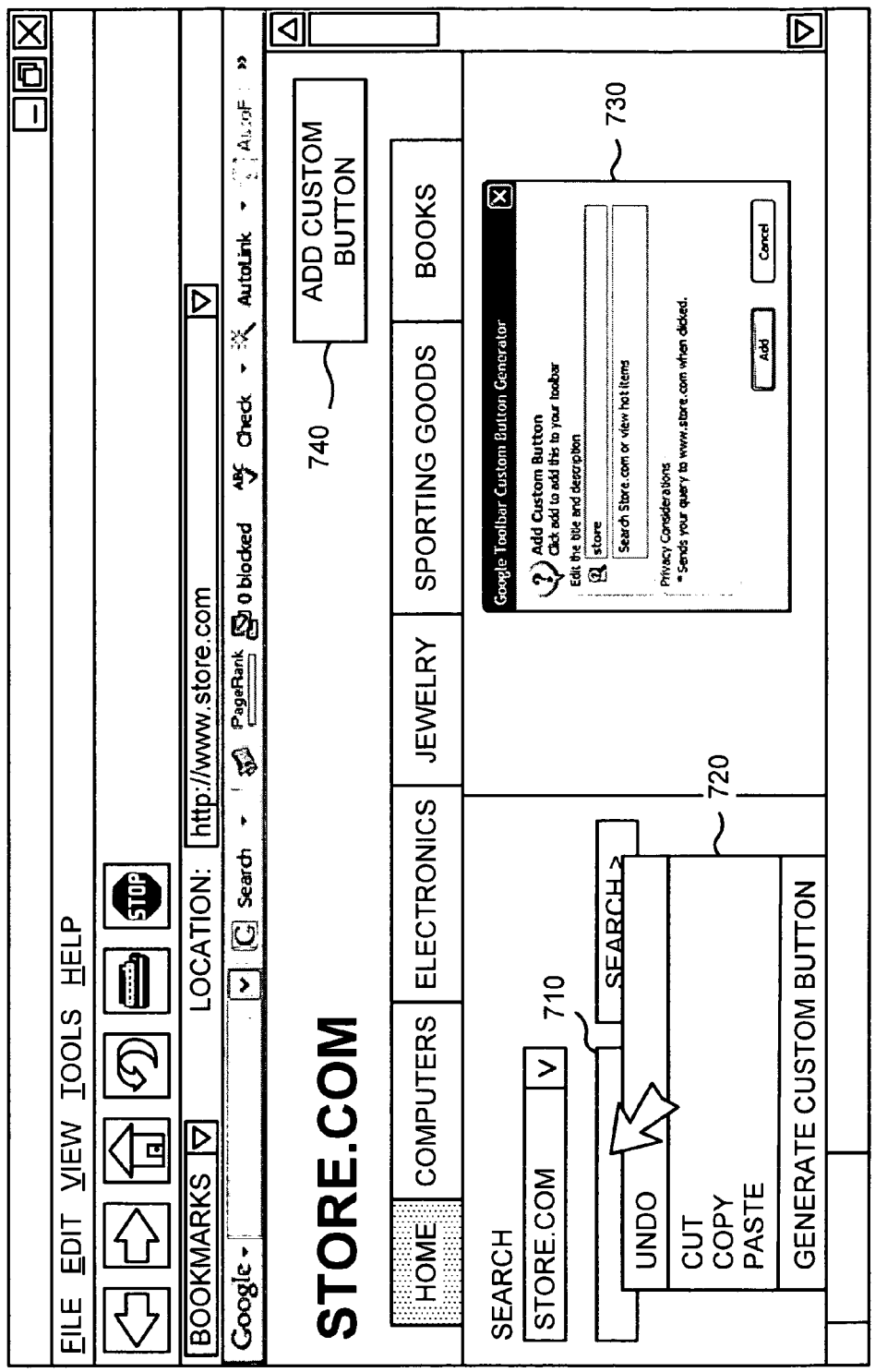
FIGS. 7 and 8 are diagrams of a few exemplary implementations for creating/editing a custom button.
Figure 8:
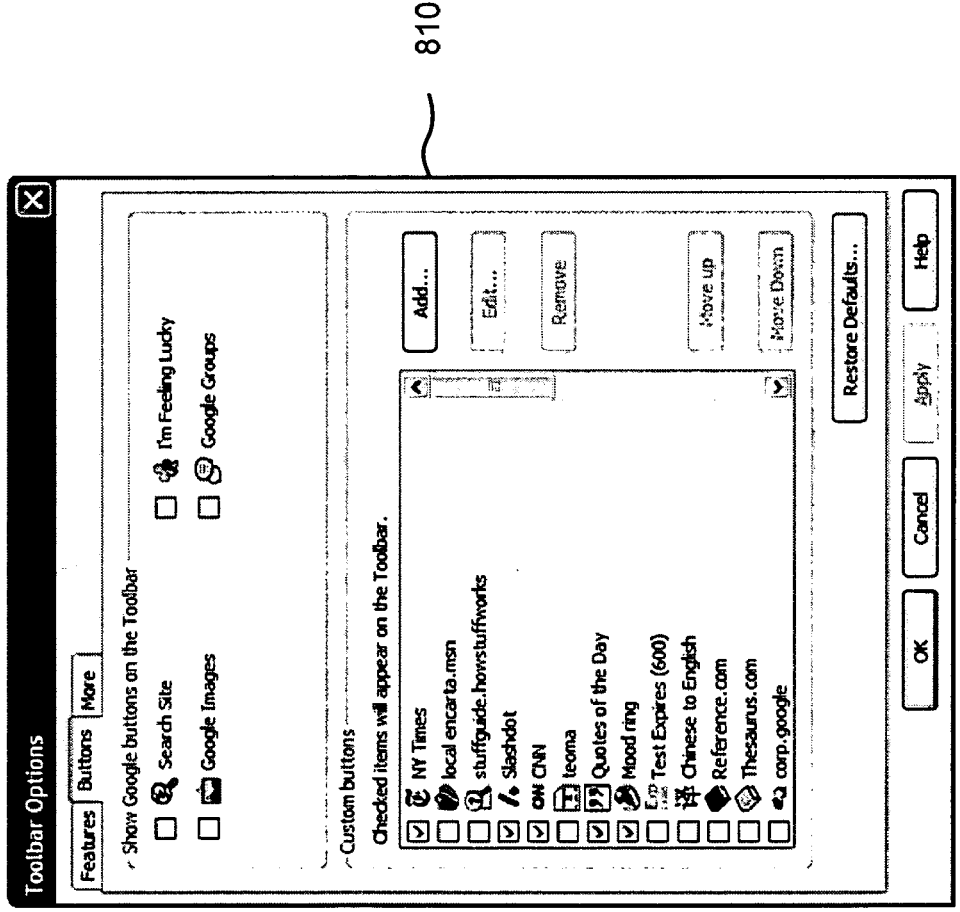

There are a few ways that a user can create and/or edit a custom button. FIGS. 7 and 8 are diagrams of a few exemplary implementations for creating/editing a custom button. As shown in FIG. 7, assume that a user has accessed a web document that provides a submit form. A submit form, as known in the art, is a form with a submit button, such as a search box with a submit button. Many existing web sites include submit forms to permit users to search their content. For example, news web sites typically include submit forms to permit users to locate news items of interest, retailer web sites typically include submit forms to permit users to locate products of interest, airline web sites typically include submit forms to permit users to find information regarding flights, etc. Oftentimes, these web sites include a private search engine that conducts a search of a private database associated with the web sites.

As shown in FIG. 7, the web document may provide a search box 710 into which a user may enter one or more search terms to find an item of interest. To add a custom button, according to one implementation consistent with the principles of the invention, the user may place a cursor in search box 710 and right-click. A parser associated with the toolbar (on client 210) may detect that search box 710 is a submit form. The toolbar may then cause a dialog box 720 to be presented. Dialog box 720 may give the user an option to generate a custom button. If the user selects the option to generate a custom button, the toolbar may cause dialog box 730 to be presented. Dialog box 730 may permit the user to confirm that the user desires to create a custom button relating to the web document, may permit the user to edit the title and/or description for the custom button, and may identify one or more of the functions that the custom button may perform. If the user agrees to the creation of the custom button, then the toolbar may automatically download an XML button file and cause the custom button to appear on the toolbar.

Alternatively or additionally, as shown in FIG. 7, the web document may provide a selectable object 740, such as a button or link, that may permit the user to add a custom button for the web document. To add a custom button, according to one implementation consistent with the principles of the invention, the user may select selectable object 740, which may cause dialog box 730 to be presented, as described above.

Alternatively or additionally, a custom button may be created manually. As shown in FIG. 8, the user may access a custom button editor 810 from the toolbar. Custom button editor 810 may permit the user to create or edit custom buttons. If the user indicates that the user wants to create or edit a custom button, the user may be presented with a text editor (e.g., located within a text editor web document) and raw XML code, possibly along with a tutorial that explains what the different pieces of code mean. The text editor may permit the user to change, add, and/or save the XML code. In one implementation, the user's changes/additions may be presented to the user on the toolbar, possibly while the user is still accessing the text editor. As a safety measure, the text editor or toolbar may refuse to accept any changes/additions that are incorrect or possibly damaging.

Instead of a text editor, the user may be presented with a custom button template or wizard that may guide the user in entering information to create or edit a custom button. Like the text editor implementation, the template/wizard may permit the user to change, add, and/or save information associated with the button. Like the text editor implementation, the user's changes/additions may be presented to the user on the toolbar, possibly while the user is still accessing the template/wizard. As a safety measure, the template/wizard or toolbar may refuse to accept any changes/additions that are incorrect or possibly damaging.

It may be possible for a user to try to add a custom button when the user has never installed the toolbar. This situation may be detected when the user attempts to add the custom button. When this occurs, the user may be prompted to install the toolbar before being permitted to add the custom button. The user might be directed to a web site from which the user may download the toolbar software.

Exemplary Processing

A number of different functions that may be performed by a custom button will now be described. In the description to follow, assume that a custom button has been created that is associated with a weather document that provides weather-related information.

First Exemplary Function

Figure 9:
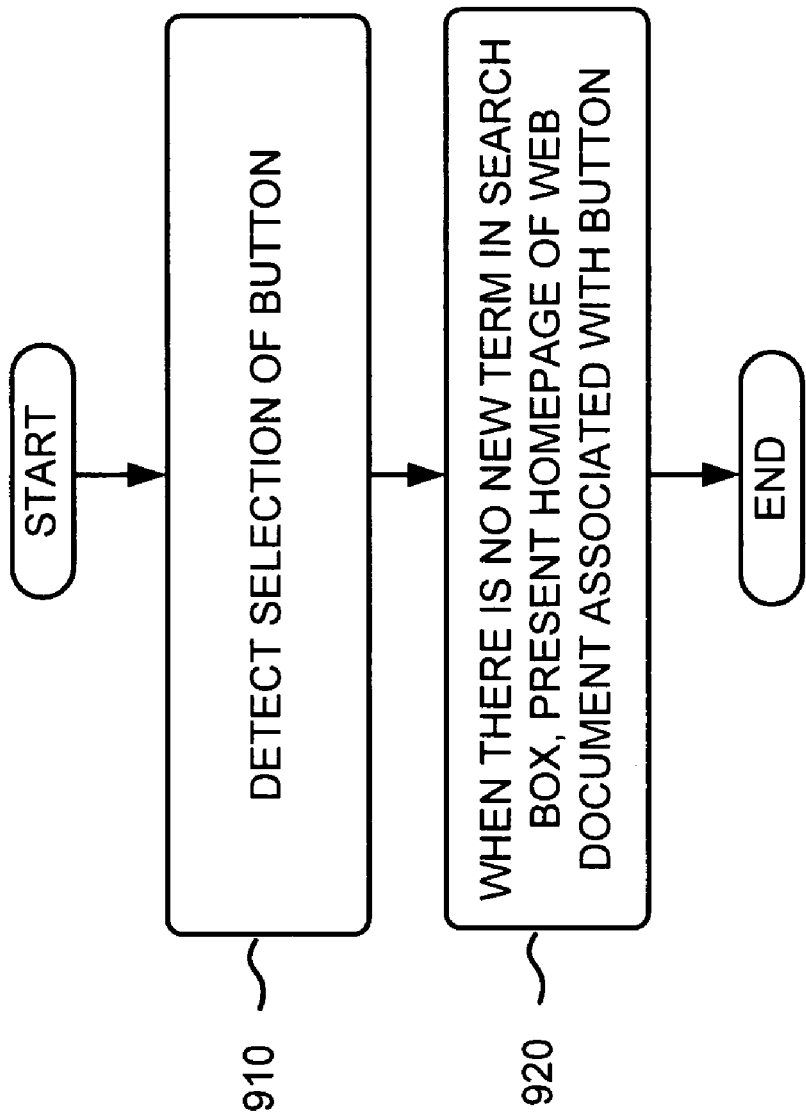
FIG. 9 is a flowchart of a first exemplary function that may be performed by a custom button.
Figure 10A:
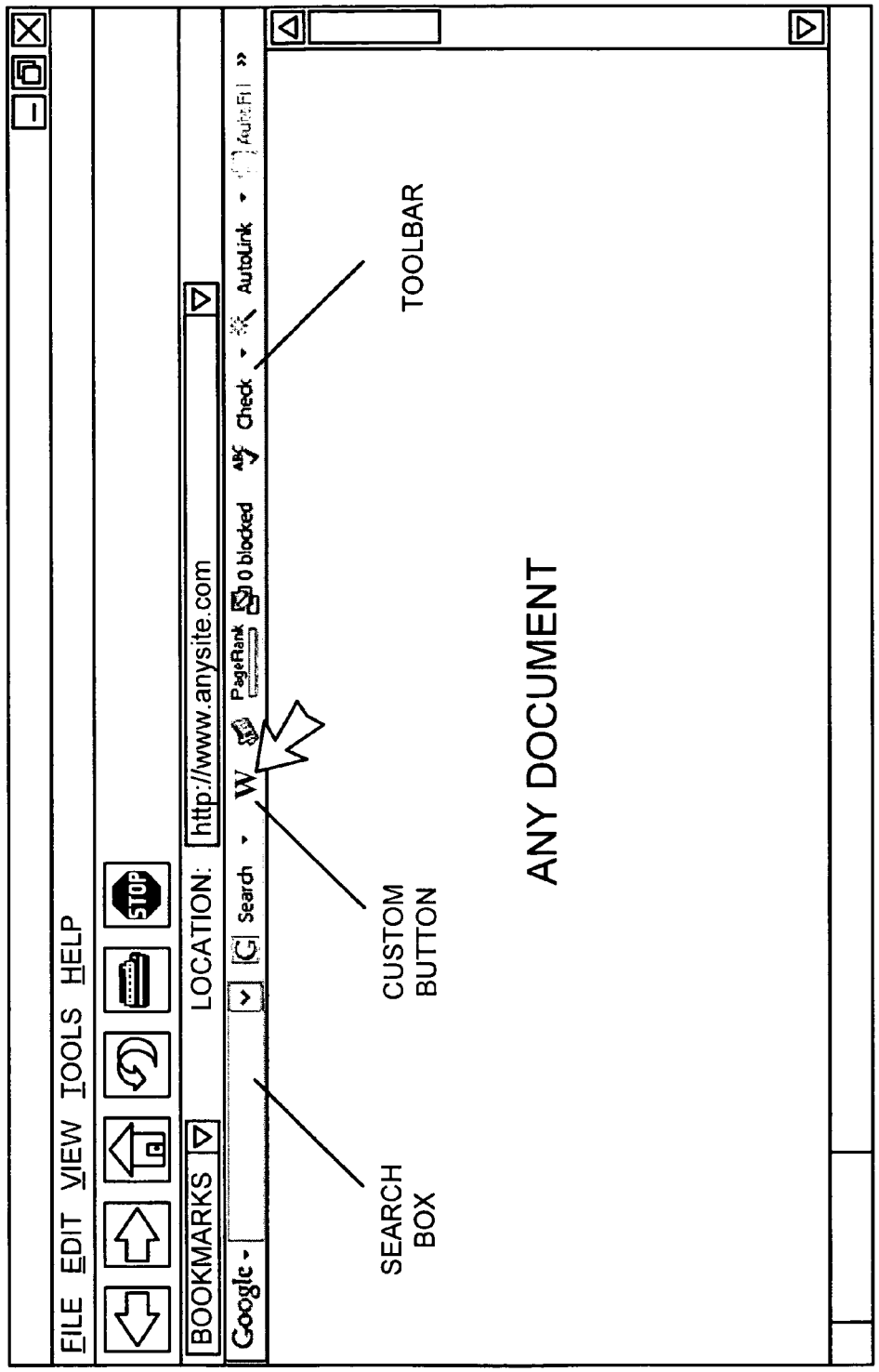
FIGS. 10A and 10B are exemplary diagrams of information that may be presented to a user in conjunction with the first exemplary function of FIG. 9.
Figure 10B:
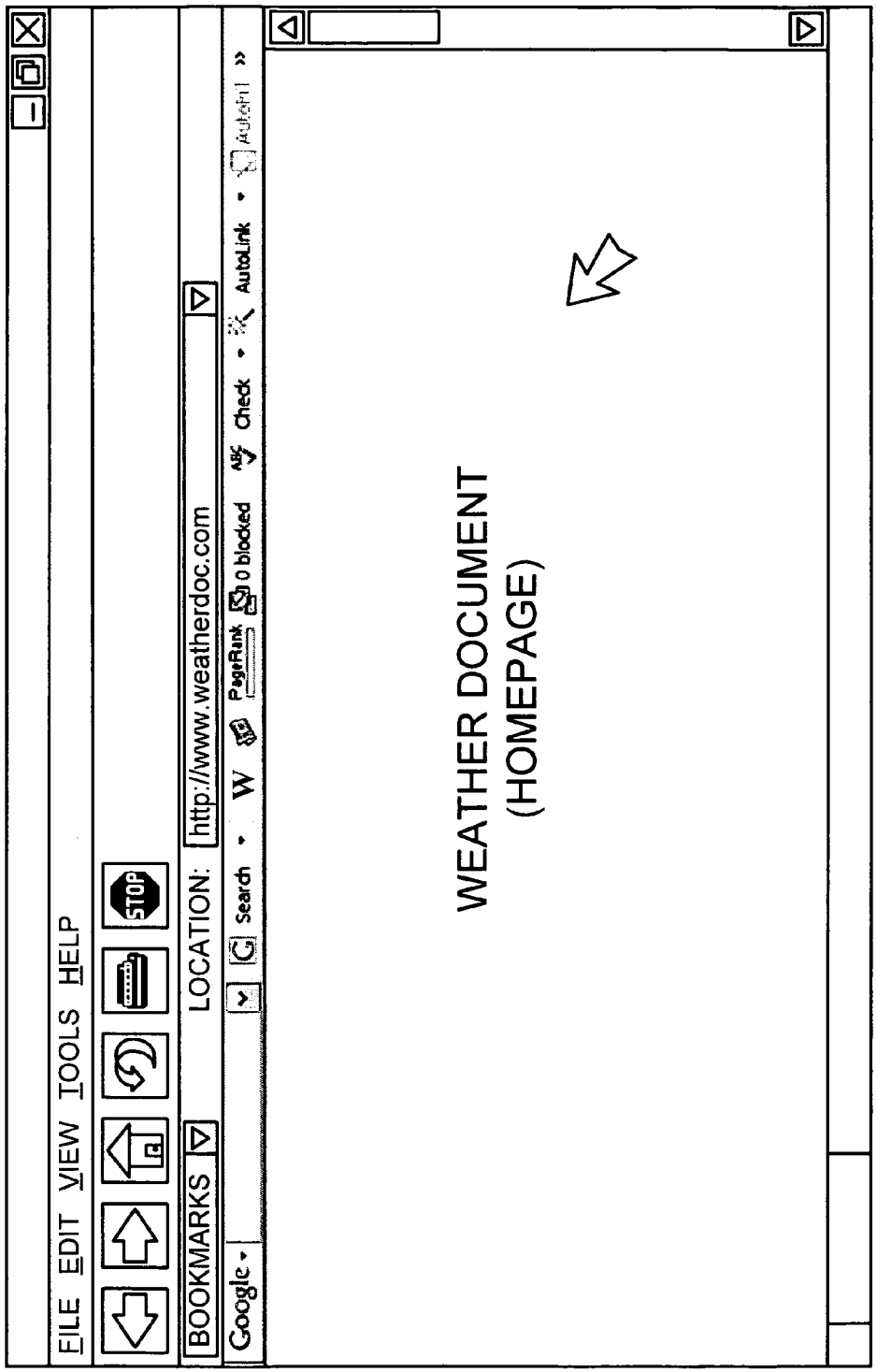

FIG. 9 is a flowchart of a first exemplary function that may be performed by a custom button. FIGS. 10A and 10B are exemplary diagrams of information that may be presented to a user in conjunction with the first exemplary function of FIG. 9. In one implementation, the processing of FIG. 9 may be performed by one or more software and/or hardware components within client 210. In another implementation, the processing may be performed by one or more software and/or hardware components within another device or a group of devices separate from or including client 210.

Processing may begin with document information being presented to a user, as shown in FIG. 10A. For example, the user might provide an address to a web browser on a client 210, which may result in a document being displayed within the web browser window. Alternatively, the user might provide a search query to a search engine interface or to a search box of a toolbar, which may result in a list of search results being displayed within the web browser window. In this case, the document may correspond to the list of search results or a search result document in the list of search results.

Selection of the custom button may be detected (block 910). For example, the toolbar on which the custom button is provided may determine when the user has selected (e.g., clicked on) the custom button. When there is no new term in the search box, the homepage (or another predetermined page) of the web document with which the custom button is associated may be presented (block 920). As explained above, a "new term" may refer to one or more terms that have recently been focused (i.e., the term(s) have been recently entered or a cursor has recently been placed over the term(s)). In the case of the weather document example, selection of the custom button may cause the homepage of the weather document to be presented, as shown in FIG. 10B.

Second Exemplary Function

Figure 11:
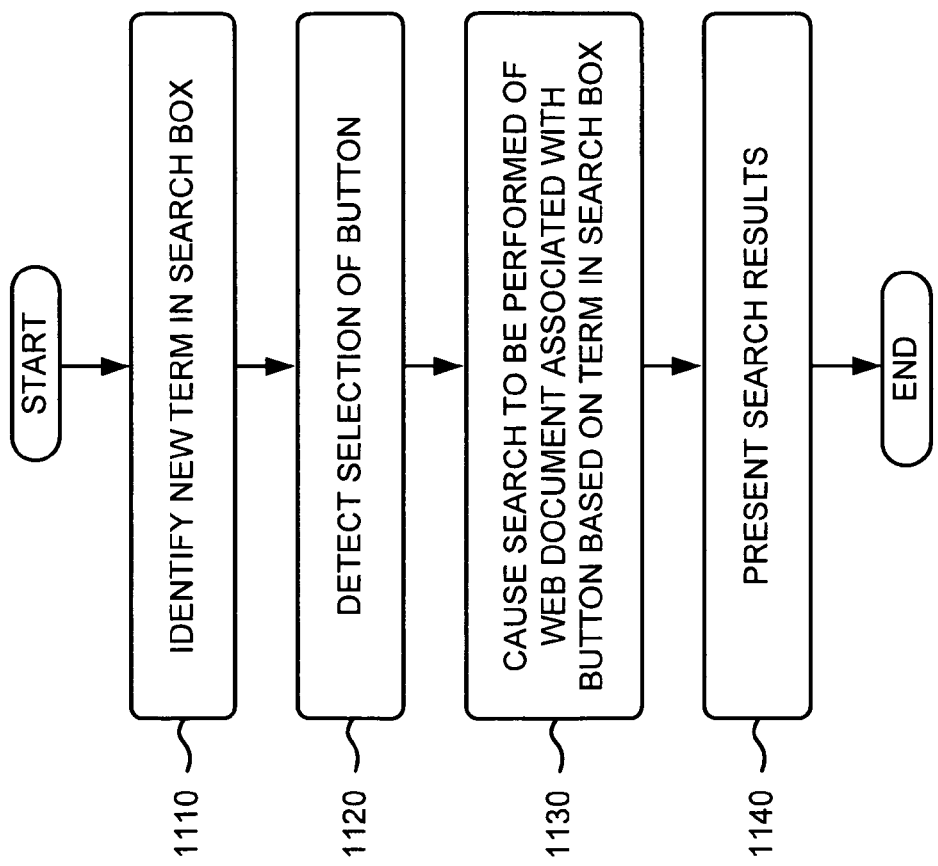
FIG. 11 is a flowchart of a second exemplary function that may be performed by a custom button.
Figure 12A:
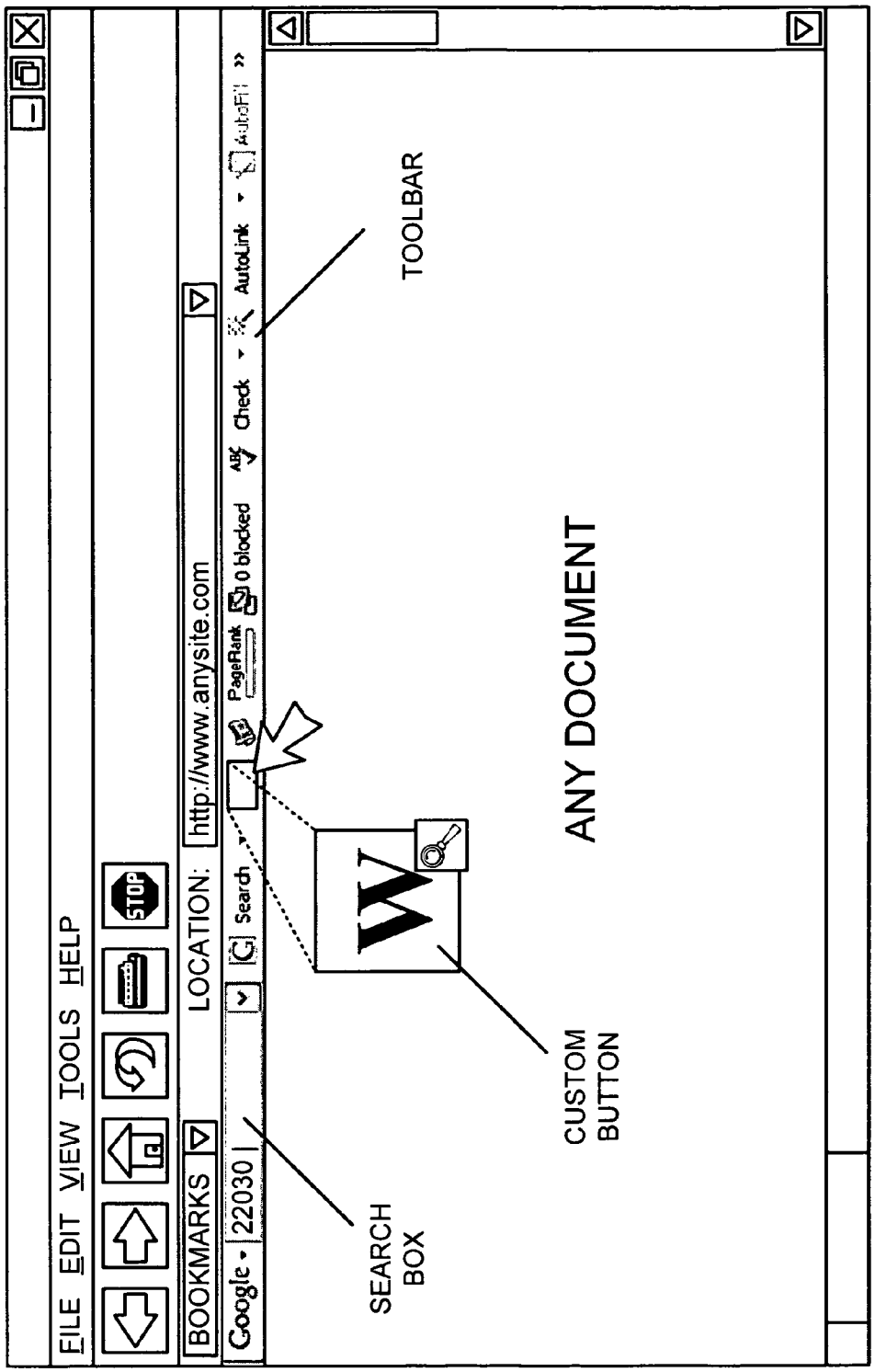
FIGS. 12A and 12B are exemplary diagrams of information that may be presented to a user in conjunction with the second exemplary function of FIG. 11.
Figure 12B:
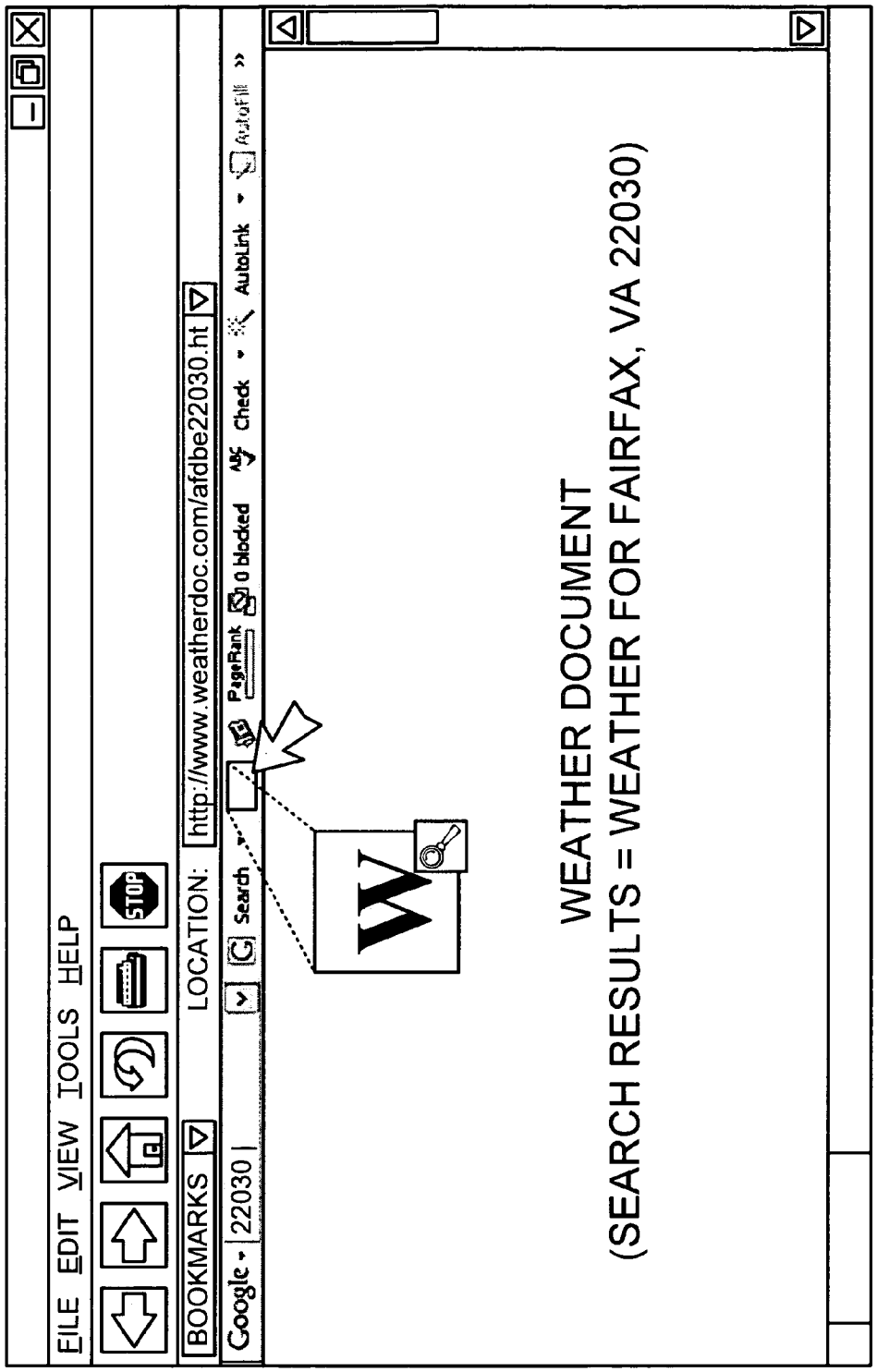

FIG. 11 is a flowchart of a second exemplary function that may be performed by a custom button. FIGS. 12A and 12B are exemplary diagrams of information that may be presented to a user in conjunction with the second exemplary function of FIG. 11. In one implementation, the processing of FIG. 11 may be performed by one or more software and/or hardware components within client 210. In another implementation, the processing may be performed by one or more software and/or hardware components within another device or a group of devices separate from or including client 210.

Processing may begin with document information being presented to a user, as shown in FIG. 12A. For example, the user might provide an address to a web browser on a client 210, which may result in a document being displayed within the web browser window. Alternatively, the user might provide a search query to a search engine interface or to a search box of a toolbar, which may result in a list of search results being displayed within the web browser window. In this case, the document may correspond to the list of search results or a search result document in the list of search results.

A new term may be identified in the search box (block 1110). As explained above, a "new term" may refer to one or more terms that have recently been focused (i.e., the term(s) have been recently entered or a cursor has recently been placed over the term(s)). In the case of the weather document example, assume that the new term corresponds to "22030," as shown in FIG. 12A.

In one exemplary implementation, the icon for the custom button may be modified to show that a new term has been identified in the search box. As shown in FIG. 12A, the icon of the custom button has been supplemented with a magnifying glass icon to signify that selection of the custom button may cause a search to be performed. The modified icon may be presented automatically or when the user places a cursor over the custom button.

Selection of the custom button may be detected (block 1120). For example, the toolbar on which the custom button is provided may determine when the user has selected (e.g., clicked on) the custom button. When there is a new term in the search box, a search may be performed of the web document with which the custom button is associated based on the term in the search box and search results may be presented (blocks 1130 and 1140). For example, the term may be sent to the web document encoded in a format recognized by the web document. The term may be automatically entered into the web document's submit form (e.g., search box) and the submit button may be automatically pressed. A search may then be performed on the web document's database using the search engine associated with the web document. For example, the search and search results may be the same as if the user went to the web document, entered the term in the web document's submit form, and selected the submit button. In the case of the weather document example, selection of the custom button may cause a search to performed of the weather document based on the term "22030" and search results to be presented, as shown in FIG. 12B. The search results may relate to weather for Fairfax, Va. 22030, as shown in FIG. 12B.

Third Exemplary Function

Figure 13:
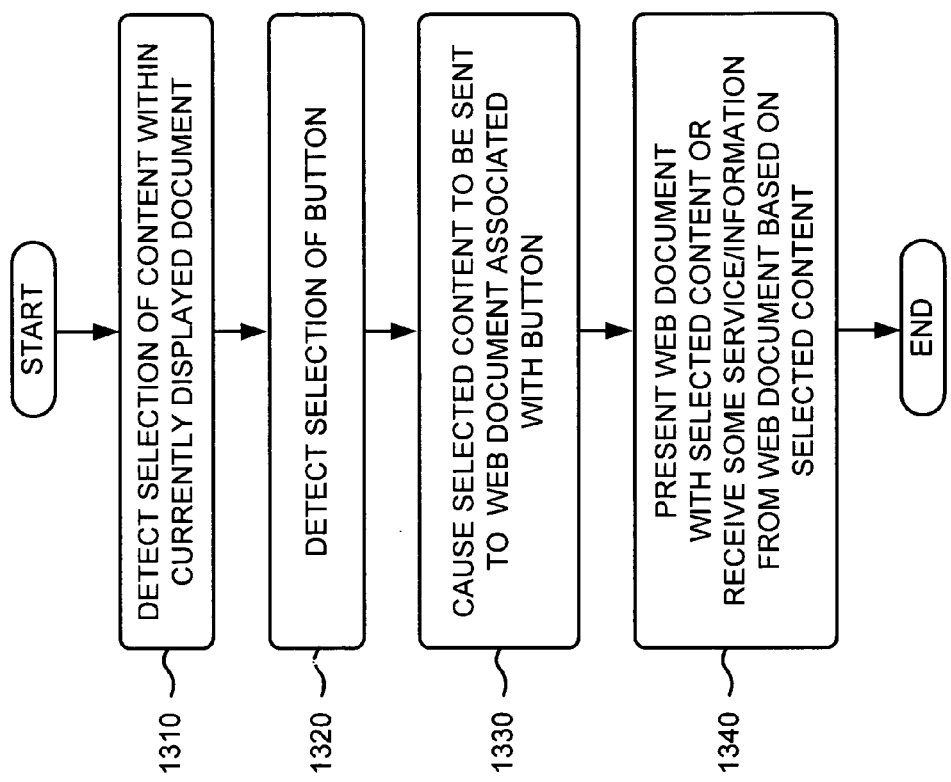
FIG. 13 is a flowchart of a third exemplary function that may be performed by a custom button.
Figure 14A:
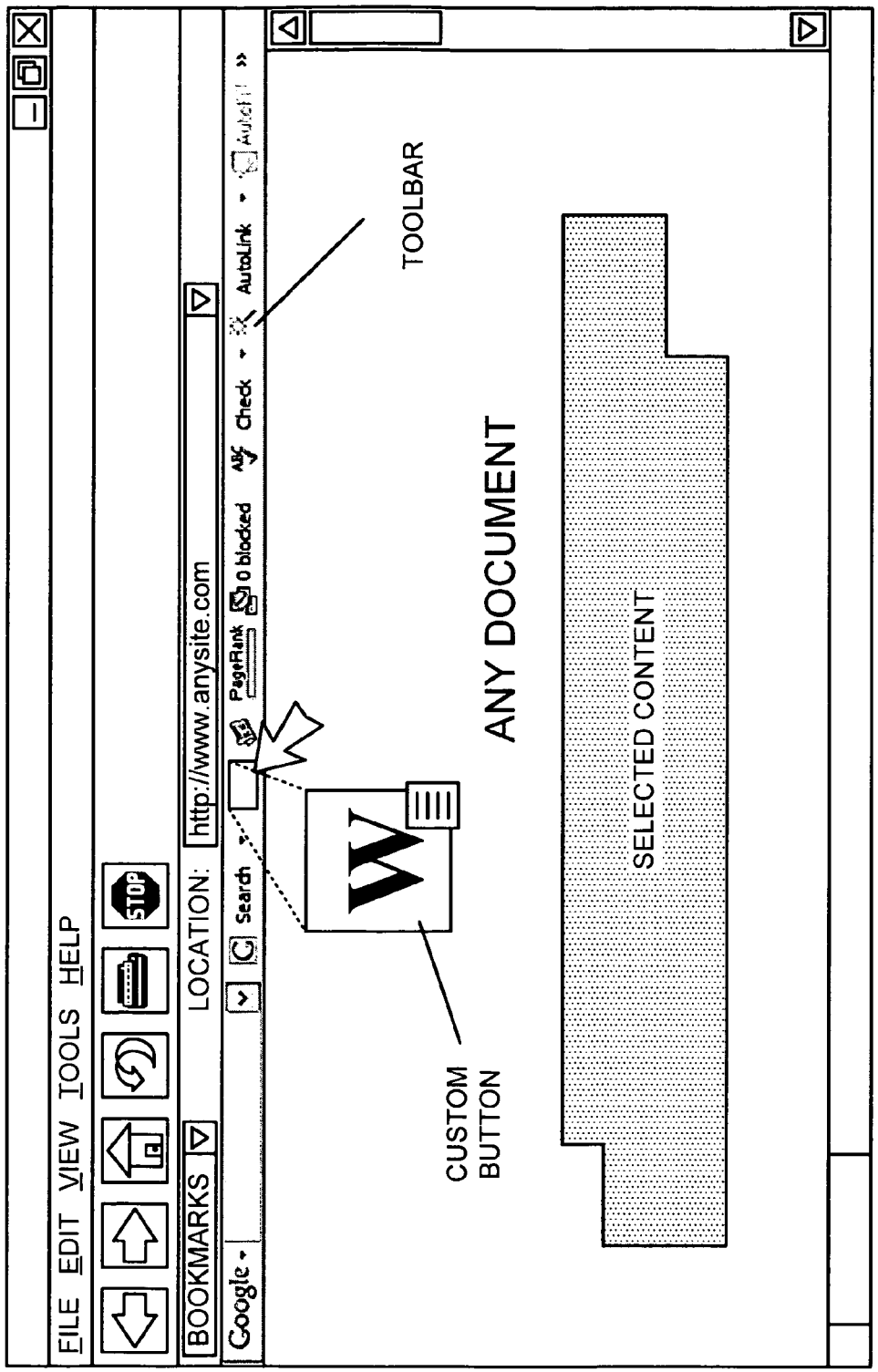
FIGS. 14A and 14B are exemplary diagrams of information that may be presented to a user in conjunction with the third exemplary function of FIG. 13.
Figure 14B:
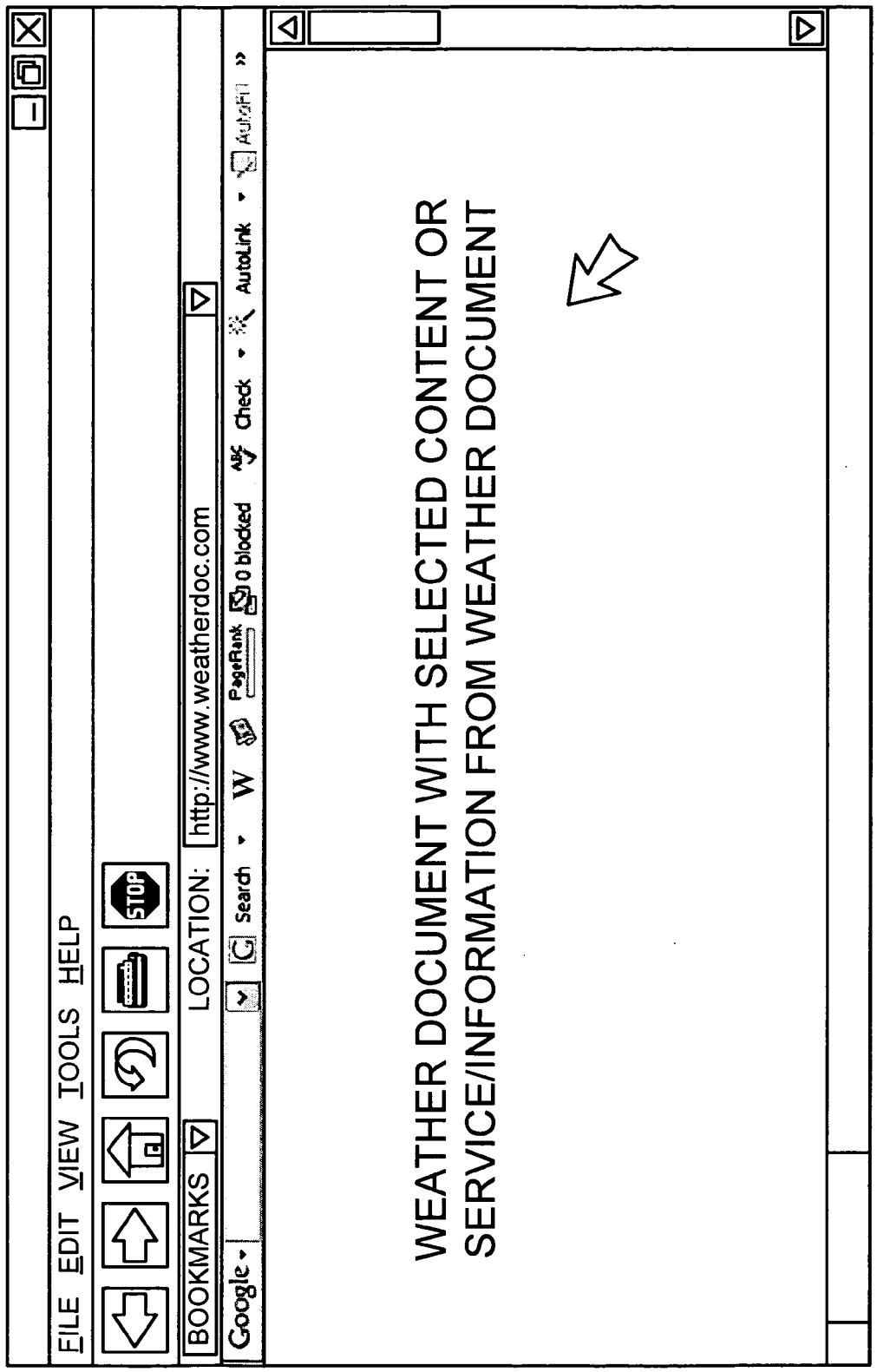

FIG. 13 is a flowchart of a third exemplary function that may be performed by a custom button. FIGS. 14A and 14B are exemplary diagrams of information that may be presented to a user in conjunction with the third exemplary function of FIG. 13. In one implementation, the processing of FIG. 13 may be performed by one or more software and/or hardware components within client 210. In another implementation, the processing may be performed by one or more software and/or hardware components within another device or a group of devices separate from or including client 210.

Processing may begin with document information being presented to a user, as shown in FIG. 14A. For example, the user might provide an address to a web browser on a client 210, which may result in a document being displayed within the web browser window. Alternatively, the user might provide a search query to a search engine interface or to a search box of a toolbar, which may result in a list of search results being displayed within the web browser window. In this case, the document may correspond to the list of search results or a search result document in the list of search results.

Selection of content within the document displayed within the web browser window may be detected (block 1310). For example, the user may select a portion of the content of the document by, for example, highlighting the content portion, as shown in FIG. 14A. The toolbar may detect the selection of the document content using known techniques.

In one exemplary implementation, the icon for the custom button may be modified to show that content of the currently displayed document has been selected. As shown in FIG.

14A, the icon of the custom button has been supplemented with a document icon to signify that selection of the custom button may cause the selected content to be sent to the web document associated with the custom button (e.g., the weather document). The modified icon may be presented automatically or just when the user places a cursor over the custom button.

Selection of the custom button may be detected (block 1320). For example, the toolbar on which the custom button is provided may determine when the user has selected (e.g., clicked on) the custom button. The selected content may then be sent to the web document with which the custom button is associated (block 1330). The selected content may be encoded in a format expected by the web document (e.g., a format as if the user entered the content directly on the web document). The selected content may be used to populate a form (e.g., email, blog, text message, or another type of form) or obtain some action (e.g., performance of a service or provision of information) based on the selected content.

Based on sending the selected content to the web document associated with the custom button, the web document with the selected content may be presented and/or some service or information from the web document may be received (block 1340). In the case of the weather document example, the selected content may be used to populate a form on the weather document or to obtain some service or information from the weather document, as shown in FIG. 14B. Assume that the weather document offers a form for receiving feedback. In this case, the selected content may be automatically provided within the feedback form. Alternatively, assume that the weather document offers a translation service. In this case, the selected content may be provided to the weather document to obtain translation of the text within the selected content.

Fourth Exemplary Function

Figure 16A:
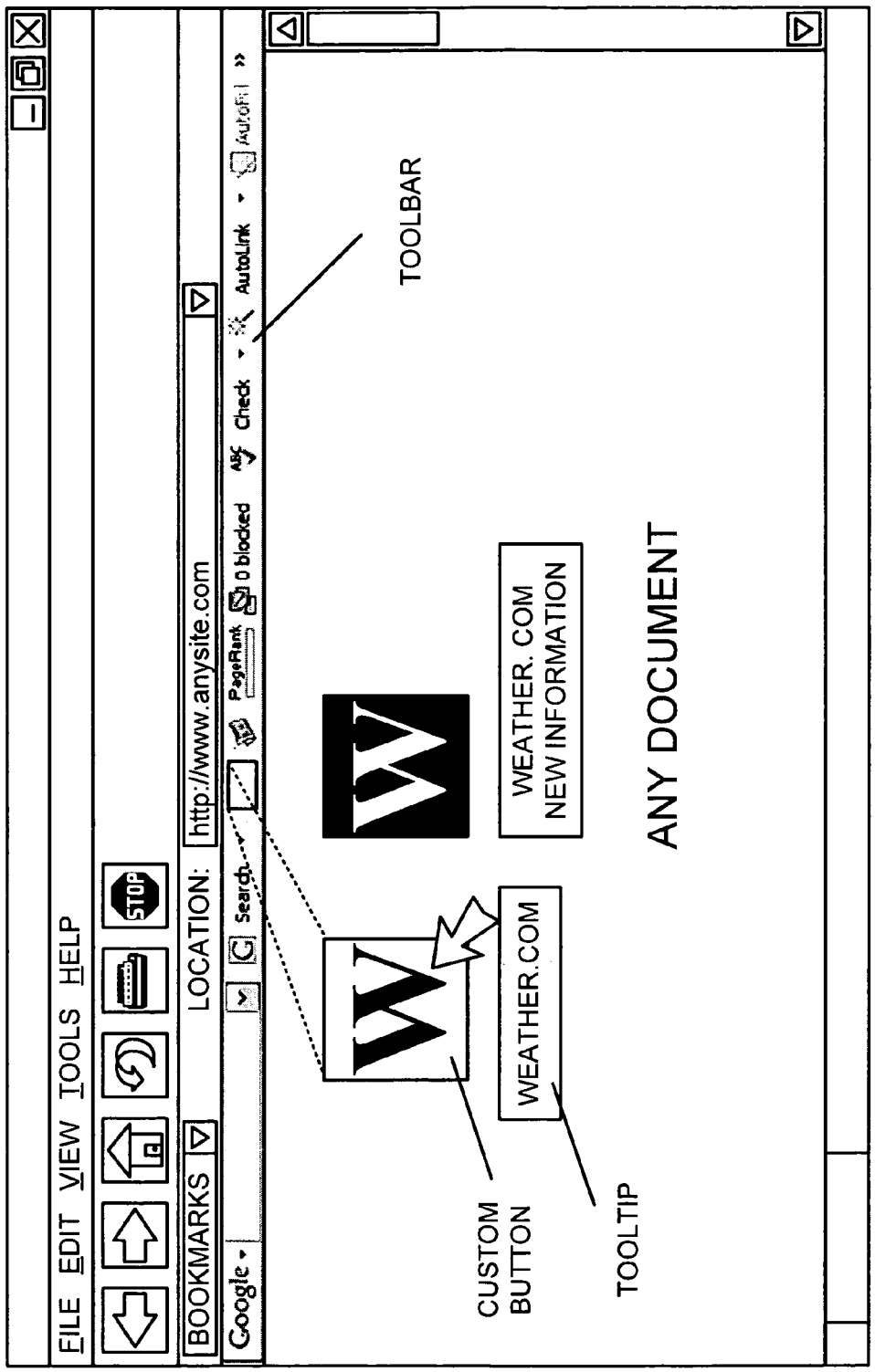
FIGS. 16A and 16B are exemplary diagrams of information that may be presented to a user in conjunction with the fourth exemplary function of FIG. 15.
Figure 16B:
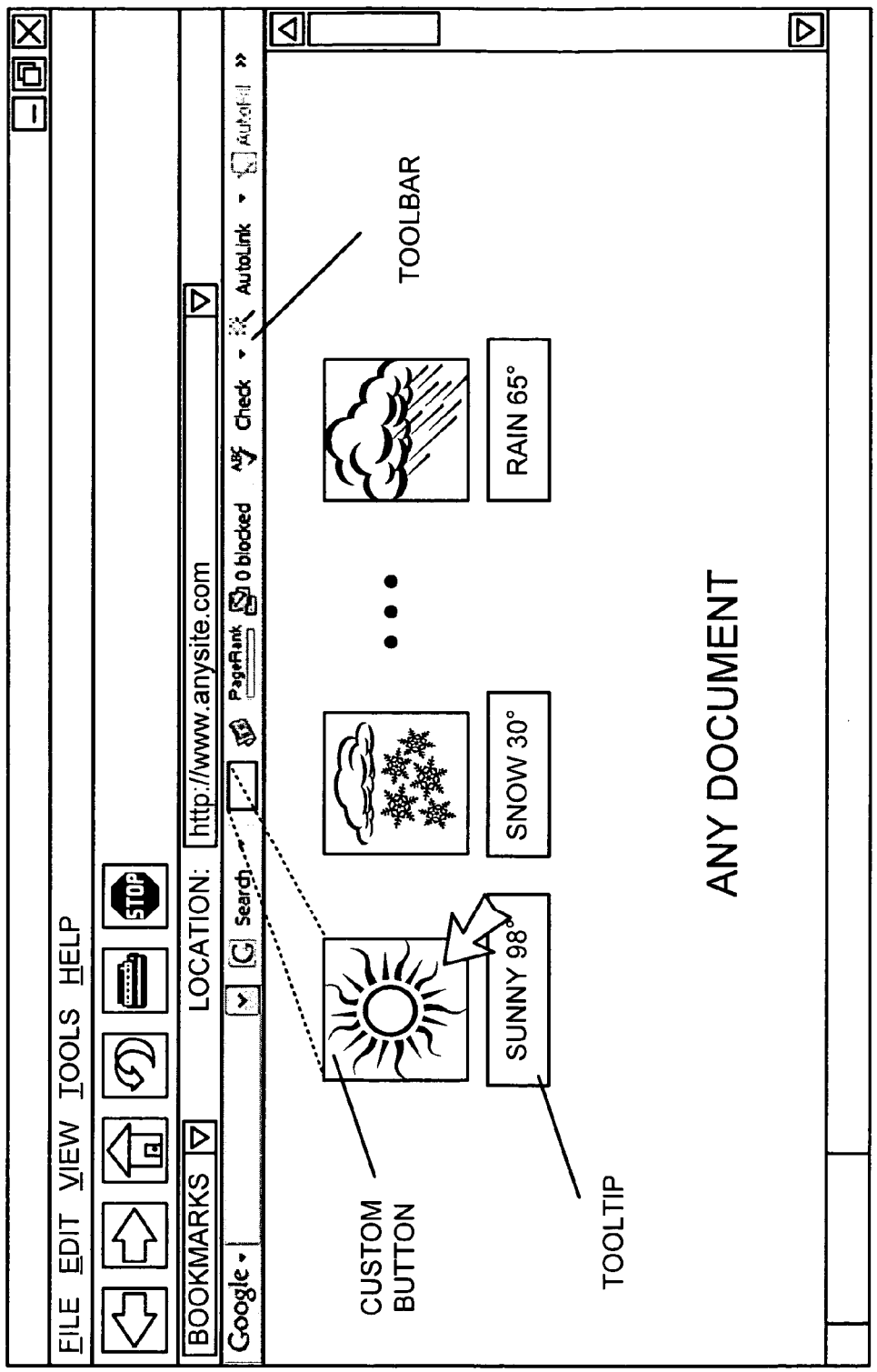

FIG. 15 is a flowchart of a fourth exemplary function that may be performed by a custom button. FIGS. 16A and 16B are exemplary diagrams of information that may be presented to a user in conjunction with the fourth exemplary function of FIG. 15. In one implementation, the processing of FIG. 15 may be performed by one or more software and/or hardware components within client 210. In another implementation, the processing may be performed by one or more software and/or hardware components within another device or a group of devices separate from or including client 210.

Processing may begin with a data feed being received (block 1510). In one implementation, the data feed may take the form of an RSS, Atom, or XML feed. Assume that the web document associated with the custom button provides the data feed. In the case of the weather document example, the weather document may provide a data feed relating to current and/or future weather conditions.

The icon and/or tooltip for the custom button may be set based on the data feed (block 1520). In one implementation, the information for the icon and/or tooltip may be included in the data feed. In another implementation, the information for the icon and/or tooltip may be previously stored and identified based on the data feed.

Periodically, the data feed and icon/tooltip may be updated (block 1530). In one implementation, the update rate of the data feed and/or the icon/tooltip may be user configurable. The user may be permitted to specify how often a new data feed may be received/obtained. In another implementation, the update rate of the data feed and/or icon/tooltip may be preset by, for example, the data feed provider.

In one implementation, the icon/tooltip may be configured to switch between two (or more) states, as shown in FIG. 16A. In the first state, the icon/tooltip may indicate that old data feed information is present. "Old data feed information" may refer to data feed information that the user has already accessed (e.g., the user has caused the tooltip to appear or the user has selected the custom button). In the second state, the icon/tooltip may indicate that new data feed information is present. "New data feed information" may refer to data feed information that the user has not yet accessed (e.g., the user has not caused the tooltip to appear and/or the user has not selected the custom button since the data feed has been updated). The manner in which the icon/tooltip is changed to indicate that new data feed information is present can include any technique, such as changing the text, color, font, icon, and/or other features associated with the icon and/or tooltip associated with the custom button. The icon/tooltip may be changed in yet other ways in yet other states to identify varying degrees of information. For example, in the case of the weather document example, the icon/tooltip may be changed to indicate emergency weather conditions in addition to or instead of switching between the new/old data feed information states.

In another implementation, the icon/tooltip may be configured based on information in the data feed, as shown in FIG. 16B. For example, the icon/tooltip data may be included in the data feed. In the weather document example, the icon/tooltip might be set based on current and/or future weather conditions. For example, the icon/tooltip might identify the current and/or future weather conditions and may identify the current and/or future temperature. In the case of a news document, the icon/tooltip might identify breaking news items and/or news items in which the user has expressed an interest. For example, if the user has expressed an interested in obtaining news items relating to Britney Spears, the icon/tooltip might be set to identify when a new news item relating to Britney Spears is available.

Fifth Exemplary Function

Figure 18:
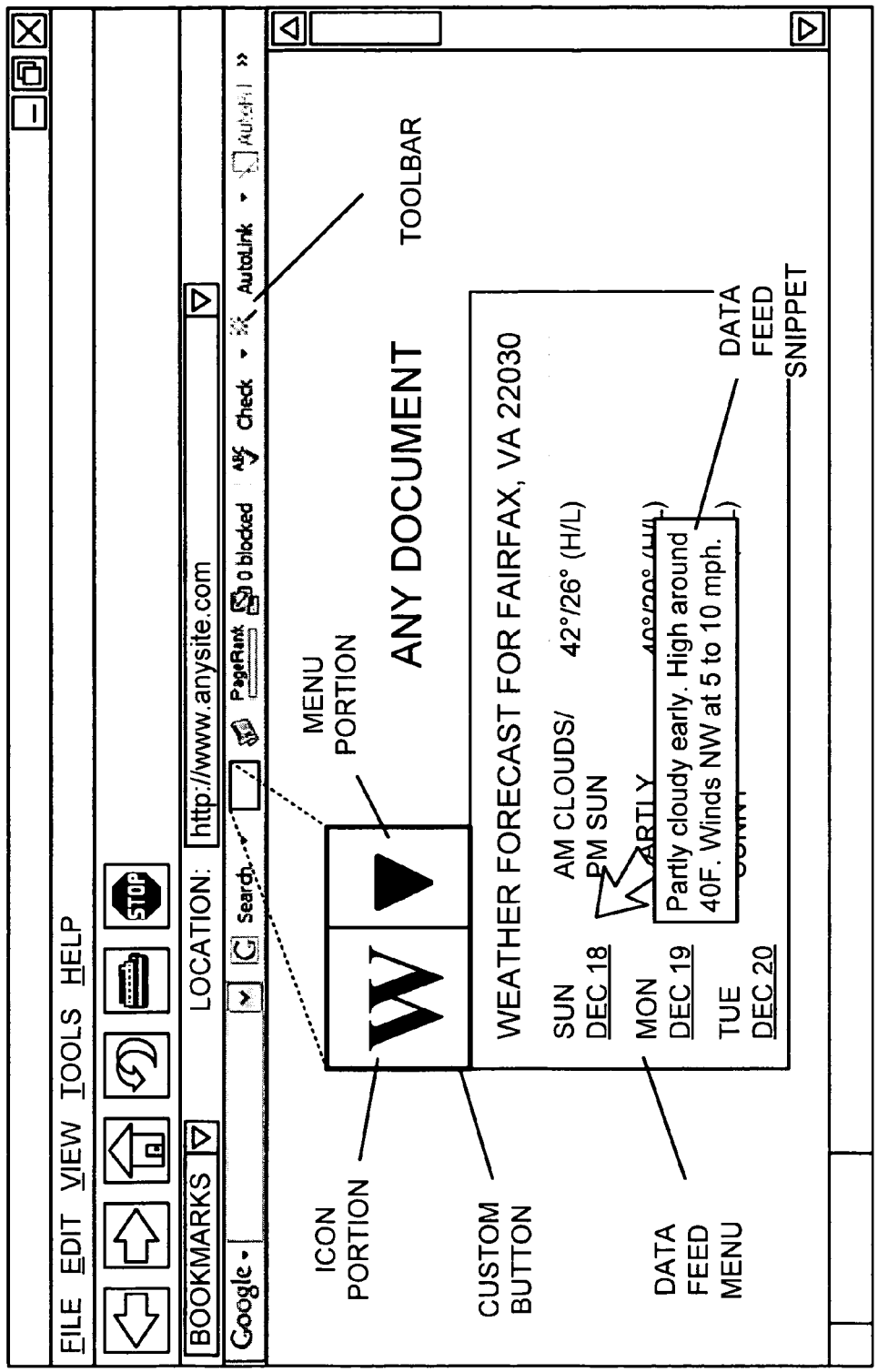
FIG. 18 is an exemplary diagram of information that may be presented to a user in conjunction with the fifth exemplary function of FIG. 17.

FIG. 17 is a flowchart of a fifth exemplary function that may be performed by a custom button. FIG. 18 is an exemplary diagram of information that may be presented to a user in conjunction with the fifth exemplary function of FIG. 17. In one implementation, the processing of FIG. 17 may be performed by one or more software and/or hardware components within client 210. In another implementation, the processing may be performed by one or more software and/or hardware components within another device or a group of devices separate from or including client 210.

Processing may begin with a data feed being received (block 1710). In one implementation, the data feed may take the form of an RSS, Atom, or XML feed. Assume that the web document associated with the custom button provides the data feed. In the case of the weather document example, the weather document may provide a data feed relating to current and/or future weather conditions.

The data feed menu may be set based on the data feed (block 1720). The data feed menu may correspond to a drop down or pop up window that may appear when the user places a cursor over or selects the menu portion of the custom button. In one implementation, the information for the data feed menu may be included in the data feed. Each of the items in the data feed menu may include a selectable object. Selection of one of these objects may direct the web browser to the web document associated with the custom button and present more detailed information regarding the item. The data feed menu may also include information regarding the last time the data feed menu has been updated. In the weather document example, the data feed menu may provide information relating to current and/or future weather conditions, as shown in FIG. 18. The data feed menu might also provide a snippet relating to an item in the data feed menu when the user places a cursor over the item, as shown in FIG. 18. In the weather document example, the snippet might provide more detailed weather information.

Periodically, the data feed and data feed menu may be updated (block 1730). In one implementation, the update rate of the data feed and/or the data feed menu may be user configurable. The user may be permitted to specify how often a new data feed may be received/obtained. In another implementation, the update rate of the data feed and/or data feed menu may be preset by, for example, the data feed provider.

Combination of Exemplary Functions

In one implementation, a custom button may be configured to perform a combination of the functions described above. Toolbar real estate is very limited. Therefore, it would be advantageous for a custom button to perform multiple functions, such as those described above.

FIG. 19 is a flowchart of exemplary processing that may be performed by a custom button. In one implementation, the processing of FIG. 19 may be performed by one or more software and/or hardware components within client 210. In another implementation, the processing may be performed by one or more software and/or hardware components within another device or a group of devices separate from or including client 210.

Processing may begin with selection of the custom button being detected (block 1910). For example, the user may place a cursor over the custom button and select (click) it using, for example, a mouse. Alternatively, simply placing the cursor over the custom button may be considered a selection. For example, if the cursor is placed over the custom button and held there for more than a predetermined amount of time, then this activity may be considered the same as if the user actually followed through with a selection (click).

It may then be determined whether the user selected the icon portion or the menu portion of the button (e.g., see FIG. 6E) (block 1920). If the user selected the menu portion of the custom button (block 1920—YES), then the user may be presented with the data feed menu (block 1930). As described above with regard to FIG. 18, the data feed menu may present a list of selectable items.

If the user did not select the menu portion of the custom button (block 1920—NO), then it may be determined whether the user has selected content within the document currently displayed within the web browser window (block 1940). As explained above, the toolbar may have the ability to determine what a user does within the web browser window. Therefore, when it is determined that the user has selected content within the currently displayed document (block 1940—YES), the selected content may be presented to the web document associated with the custom button (block 1950). As described above with regard to FIG. 14B, the user may be presented with a form of the web document populated with the selected content and/or a service/information from the web document based on the selected content.

If the user did not select content within the currently displayed document (block 1940—NO), then it may be determined whether there is a new term in the search box of the toolbar (block 1960). As explained above, a "new" term may refer to one or more terms that have recently been focused (i.e., the term(s) have been recently entered or a cursor has recently been placed over the term(s)). When there is a new term in the search box (block 1960—YES), then a search may be performed on the web document associated with the custom button based on the new term (block 1970). As described above with regard to FIG. 12B, the search performed on the web document may be performed by the search engine associated with the web document on a private database associated with the web document. The search results may be presented to the user. When there is no new term in the search box (block 1960—NO), then the homepage (or another predetermined page) of the web document associated with the custom button may be presented to the user (block 1980), as described above with regard to FIG. 10B.

Conclusion

Systems and methods consistent with the principles of the invention may provide a customizable button that may be implemented on a toolbar of a browser graphical user interface. The customizable button may be configured to perform a number of functions, thereby saving valuable toolbar real estate. In this way, the toolbar can be extended programmatically by building it from a number of custom button files. The custom button files are also self-contained and portable, thereby permitting them to be easily downloaded and transferred between applications.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 9, 11, 13, 15, 17, and 19, the order of the acts may be modified in other implementations consistent with the principles of the invention. Further, non-dependent acts may be performed in parallel.

Also, exemplary user interfaces have been described with respect to FIGS. 7, 8, 10A, 10B, 12A, 12B, 14A, 14B, 16A, 16B, and 18. In other implementations consistent with the principles of the invention, the user interfaces may include more, fewer, or different pieces of information.

The preceding description refers to a user. A "user" is intended to refer to a client, such as a client 210 (FIG. 2), or an operator of a client.

The preceding description focussed on techniques associated with web documents. The description equally applies to local documents (i.e., documents local to a client 210 or documents located on a local server or database accessible by client 210 via, for example, a LAN). Local documents can include documents with sensitive information and/or documents that are not available via a public network, such as the Internet.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device, comprising:
one or more processors to implement:
a browser toolbar comprising a search box and a button associated with a particular document, the one or more processors to:
detect that the search box does not include a search term,
set a visual appearance of the button to include a first visual interface, in response to detecting that the search box does not include the search term,
cause the particular document to be presented, in response to detecting a selection of the button and based on detecting that the search box does not include the search term,
detect that the search box includes the search term,
set the visual appearance of the button to include a second visual interface, different from the first visual interface, in response to detecting that the search box includes the search term, and
cause, based on the search term, a search to be performed with respect to the particular document, in response to detecting a selection of the button and based on detecting that the search box includes a search term.

2. The device of claim 1, where the button is customizable by a user of the toolbar.

3. The device of claim 1, where, when causing the particular document to be presented, the one or more processors are to cause the particular document to be presented when there is no recently added term in the search box.

4. The device of claim 1, where, when causing the search to be performed, the one or more processors are further to cause the search to be performed on a private database associated with the particular document.

5. The device of claim 1, where, when causing the search to be performed with regard to the particular document, the one or more processors are to cause the term to populate a submit form within the particular document.

6. The device of claim 1, where the one or more processors are further to:
detect when content of a currently displayed document is selected; and
cause, based on detecting that content of the currently displayed document is selected, the content from the currently displayed document to be sent to the particular document.

7. The device of claim 6, where, when causing the content from the currently displayed document to be sent to the particular document, the one or more processors are to cause the content to populate a form within the particular document or obtain an action from the particular document.

8. The device of claim 6, where, when the content of the currently displayed document is selected, the one or more processors are further to modify the visual appearance of the button.

9. The device of claim 1, where the button includes an icon or a tooltip, and where the one or more processors are further to:
receive a data feed, and
cause the icon or the tooltip to be set based on the data feed.

10. The device of claim 9, where the data feed includes an RSS, Atom, or XML feed.

11. The device of claim 9, where the one or more processors are to set the icon or the tooltip to a first state to indicate that a new data feed has been received or a second state to indicate that the data feed has already been accessed.

12. The device of claim 9, where the one or more processors are to obtain data for the icon or the tooltip from the data feed.

13. The device of claim 9, where the one or more processors are to periodically update the icon or the tooltip at user-configurable intervals.

14. The device of claim 1, where the button includes a menu, and where the one or more processors are further to:
receive a data feed, and
cause the menu to be set based on the data feed.

15. The device of claim 14, where the data feed includes an RSS, Atom, or XML feed.

16. The device of claim 14, where the menu includes a plurality of selectable objects relating to data in the data feed.

17. The device of claim 16, where the one or more processors are to cause a snippet to be presented for at least one of the selectable objects.

18. The device of claim 14, where the one or more processors are to periodically update the menu at user-configurable intervals.

19. The device of claim 1, further comprising:
a computer-readable memory device to store the button as a single XML file that includes all or substantially all code for defining the button.

20. The device of claim 19, where the code for defining the button includes at least one of:
a title attribute that defines a title for the button,
a description attribute that defines a tooltip for the button,
a site attribute that includes an address associated with the particular document associated with the button,
a search attribute that includes an address associated with the particular document and a query variable to be used to search the particular document,
a send attribute that includes an address associated with the particular document and a selection variable to be used to send content selected from another document to the particular document,
an icon attribute that defines an icon for the button,
a feed attribute that includes an address to a data feed,
a feed icon attribute that defines an alternative icon for the button,
a feed description attribute that defines an alternative tooltip for the button, or
an update attribute that includes an address from where the XML file originated.

21. The device of claim 19, where the code for defining the button includes a plurality of attributes, where at least one of the attributes occurs more than once in the XML file, where each of the occurrences of the at least one of the attributes is associated with a different locale.

22. The device of claim 19, where the code for defining the button includes a parameter that is meaningful only to the particular document associated with the button.

23. A method performed by a computer system, the method comprising:
providing, using a processor associated with the computer system, a toolbar within a browser graphical user interface, the toolbar including a search box;
providing, using a processor associated with the computer system, a button, on the toolbar, the button being associated with a particular document, the button being capable of performing a plurality of functions with regard to the particular document;
detecting, using a processor associated with the computer system, that the search box does not include a search term;

setting, using a processor associated with the computer system, a visual appearance of the button to include a first visual interface, in response to detecting that the search box does not include the search term;

causing, using a processor associated with the computer system, the particular document to be displayed, in response to detecting a selection of the button and based on detecting that the search box does not include the search term;

detecting, using a processor associated with the computer system, that the search box includes the search term;

setting, using a processor associated with the computer system, the visual appearance of the button to include a second visual interface, different from the first visual interface, in response to detecting that the search box includes the search term; and causing, using a processor associated with the computer system and based on the search term, a search to be performed with respect to the particular document, in response to detecting that the search box includes the search term.

24. A device, comprising:
means for providing a user interface object within a browser graphical user interface that includes a search box;
means for providing a button, associated with a particular document, within the user interface object, the button being capable of performing a plurality of functions with regard to the particular document;
means for detecting whether the search box includes a search term;
means for setting a visual appearance of the button to include a first visual interface, in response to detecting that the search box includes the search term;
means for causing, based on the search term, a search to be performed with respect to the particular document, in response to detecting a selection of the button and based on detecting that the search box includes the search term;
means for setting the visual appearance of the button to include a second visual interface, different from the first visual interface, in response to detecting that the search box includes no search term; and
means for causing the particular document to be displayed, in response to detecting a selection of the button and based on detecting that the search box includes no search term.

25. A non-transitory computer-readable memory device that stores code executable by a computer for implementing a custom button, associated with a particular document, and a search box, where the code includes a single XML file that includes all or substantially all of the code for defining the custom button, the code including:
code that, when executed by the computer, causes the computer to:
detect whether the search box includes a search term,
set a visual appearance of the button to include a first visual interface, in response to detecting that the search box includes the search term,
cause, based on the search term, a search to be performed with respect to the particular document, in response to detecting a selection of the button and based on detecting that the search box includes the search term,
set the visual appearance of the button to include a second visual interface, different from the first visual interface, in response to detecting that the search box does not include the search term,
cause the particular document to be displayed, in response to detecting a selection of the button and based on detecting that the search box does not include the search term.

26. The computer-readable memory device of claim 25, where the code for defining the button includes at least one of:
a title attribute that defines a title for the button,
a description attribute that defines a tooltip for the button,
a site attribute that includes an address associated with a particular document associated with the button,
a search attribute that includes an address associated with the particular document and a query variable to be used to search the particular document,
a send attribute that includes an address associated with the particular document and a selection variable to be used to send content selected from another document to the particular document,
an icon attribute that defines an icon for the button,
a feed attribute that includes an address to a data feed,
a feed icon attribute that defines an alternative icon for the button,
a feed description attribute that defines an alternative tooltip for the button, or
an update attribute that includes an address from where the XML file originated.

27. The computer-readable memory device of claim 25, where the code for defining the button includes a plurality of attributes, where at least one of the attributes occurs more than once in the XML file, where each of the occurrences of the at least one of the attributes is associated with a different locale.

28. The computer-readable memory device of claim 25, where the code for defining the button includes a parameter that is meaningful only to a particular document associated with the button.

29. One or more memory devices storing instructions executable by one or more processors, the one or more instructions comprising:
one or more instructions that, when executed by the one or more processors, cause the one or more processors to:
provide a browser toolbar that includes a custom button associated with a particular document and that includes a search box associated with the custom button;
when the custom button is selected and when there is no term in the search box:
set a visual appearance of the custom button to include a first visual interface, and
present the particular document;
when the custom button is selected and when the search box includes one or more terms:
set a visual appearance of the custom button to include a second visual interface, and
cause a search to be performed on the particular document based on the one or more terms;
when the custom button is selected and when a currently displayed document includes the selected content:
set a visual appearance of the custom button to include a third visual interface, and
send selected content to the particular document; and
when a data feed is received:
set a visual appearance of the custom button to include a fourth visual interface, and
cause an icon or tooltip associated with the custom button to change based on the data feed.

30. The one or more memory devices of claim 29, where the one or more instructions to cause the one or more processors to send selected content to the particular document include one or more instructions that, when executed by the one or more processors, cause the one or more processors to cause the selected content to populate a form within the particular document.

31. The one or more memory devices of claim 29, where the custom button includes a menu and where the menu is set based on the data feed.

32. The method of claim 23, further comprising:
   detecting when content of a currently displayed document is selected; and
   causing, based on detecting that content of the currently displayed document is selected, the content from the currently displayed document to be sent to the particular document.

33. The method of claim 23, where the button includes an icon or a tooltip, and where the method further comprises:
   receiving a data feed, and
   causing the icon or the tooltip to be set based on the data feed.

34. The method of claim 33, further comprising:
   setting the icon or the tooltip to a first state to indicate that a new data feed has been received or a second state to indicate that the data feed has already been accessed.

35. The device of claim 24, further comprising:
   means for detecting when content of a currently displayed document is selected; and
   means for causing, based on detecting that content of the currently displayed document is selected, the content from the currently displayed document to be sent to the particular document.

36. The device of claim 24, where the button includes an icon or a tooltip, and where the devices further comprises:
   means for receiving a data feed, and
   means for causing the icon or the tooltip to be set based on the data feed.

37. The device of claim 36, further comprising:
   means for setting the icon or the tooltip to a first state to indicate that a new data feed has been received or a second state to indicate that the data feed has already been accessed.

* * * * *